United States Patent [19]

Swoboda et al.

[11] Patent Number: 5,922,070
[45] Date of Patent: *Jul. 13, 1999

[54] PIPELINED DATA PROCESSING INCLUDING PROGRAM COUNTER RECYCLING

[75] Inventors: Gary L. Swoboda, Sugar Land; Mark R. Hammes, Houston; Douglas Deao, Brookshire, all of Tex.; Keith Balmer, Bedford; Nick Ing-Simmons, Huntingdon, both of United Kingdom

[73] Assignee: Texas Instruments Incorporated, Dallas, Tex.

[*] Notice: This patent is subject to a terminal disclaimer.

[21] Appl. No.: 08/350,640

[22] Filed: Dec. 7, 1994

Related U.S. Application Data

[63] Continuation of application No. 08/180,400, Jan. 11, 1994, abandoned.

[51] Int. Cl.⁶ ................................................. G06F 9/00
[52] U.S. Cl. ........................................ 712/244; 712/227
[58] Field of Search .............................. 395/375, 500, 395/591, 568; 364/232.9; 712/244, 227

[56] References Cited

U.S. PATENT DOCUMENTS

| | | | |
|---|---|---|---|
| 3,673,573 | 6/1972 | Smith | 714/45 |
| 3,937,938 | 2/1976 | Matthews | 714/46 |
| 4,488,227 | 12/1984 | Miu et al. | 712/244 |
| 4,498,136 | 2/1985 | Sproul, III | 710/262 |
| 4,546,431 | 10/1985 | Horvath | 712/243 |
| 4,559,596 | 12/1985 | Ohnishi | 712/228 |
| 4,674,089 | 6/1987 | Poret et al. | 714/28 |
| 4,777,594 | 10/1988 | Jones et al. | 712/240 |
| 4,860,195 | 8/1989 | Krauskopf | 711/202 |
| 4,879,646 | 11/1989 | Iwasaki et al. | 712/239 |
| 4,924,466 | 5/1990 | Gregor et al. | 714/2 |
| 5,150,469 | 9/1992 | Jouppi | 712/244 |
| 5,187,791 | 2/1993 | Baum | 710/268 |
| 5,197,132 | 3/1993 | Steely, Jr. et al. | 712/217 |
| 5,218,711 | 6/1993 | Yoshida | 712/34 |
| 5,237,700 | 8/1993 | Johnson et al. | 712/244 |
| 5,283,873 | 2/1994 | Steely et al. | 712/207 |
| 5,564,028 | 10/1996 | Swoboda et al. | 712/227 |
| 5,603,047 | 2/1997 | Caulk, Jr. | 712/23 |
| 5,724,566 | 3/1998 | Swoboda et al. | 712/245 |
| 5,774,709 | 6/1998 | Worrell | 712/233 |

OTHER PUBLICATIONS

Y. Tamir et al., Strategies for Managing the Register Files in RISC; IEEE Transactions on Computers; vol. C–32, No. 11; pp. 977–989, Nov. 1983.

Y. Tamir et al.; "The Implementation and Application of Micro Rollback in Fault–Tolerant VLSI Systems"; 18th Fault–Tolerant Computing Systems Conference; pp. 234–239, 1988.

A.J. van de Goor; Computer Architecture and Design; Addison–Wesley Publishers; pp. 212–213, 1989.

R. Zaks et al; From Chips to Systems: An Introduction to Microcomputers; 2nd Ed.; SYBEX Inc; pp. 60–68, 83–85, 239–241, 426–431, 482–484, 1987.

IBM Technical Disclosure Bulletin, "Error tracing arrangement of a Pipelined Processor" vol. 28 No. 2 Jul. 1985, pp. 621–624.

"Computer Architecture A Quantitative Approach" John L Hennessy & David A Patterson, Ch 6 and p. 200, 1990.

*Primary Examiner*—Zami Maung
*Assistant Examiner*—Kenneth R. Coulter
*Attorney, Agent, or Firm*—Robert D. Marshall, Jr.; Gerald E. Laws; Richard L. Donaldson

[57] ABSTRACT

In a pipeline data processor (11), an address pipeline (39, 41) id provided to hold the addresses of the instructions presently in the instruction pipeline (23, 25). The address pipeline facilitates tracing only executed instructions, and permits stopping the data processor during a branch delay slot without losing the branch information.

20 Claims, 16 Drawing Sheets

FIG. 5

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:D | D:E | E:E | E:E | E:I | I:J | J:J | J:J | J:J |
| I_ADDRESS | | A:A | B:B | C:C | | | | | | | | |
| IRA | | :A | A:B | B:PS1 | PS1:PS2 | PS2:PS3 | PS3:PS4 | PS4:PS5 | I:I | J:J | :J | :J |
| IRE | | | :A | A:B | B:PS1 | PS1:PS2 | PS2:PS3 | PS3:PS4 | PS5:I | I:J | I:J | |
| IPA | | | A:B | B:C | C:D | D:D | D:D | D:D | D:I | PS5:I | :J | :J |
| IPE | | | :A | A:B | B:C | C:C | C:C | C:C | C:C | I:I | I:J | :J |
| | | | | | | | | | | C:I | | |
| INTERRUPT | | | :INT | INT:INT | INT:INT | INT:INT | INT:INT | INT:INT | INT:INT | INT:INT | INT:INT | INT:INT |
| | | | | | | | | | | | | |
| TRACE_1 | | | | | :B0 | B0:B0 | B0:B0 | B0:B0 | B0:B0 | B0:B0 | B0:I1 | I1:I1 |
| TRACE_2 | | | | | | | | | | | :B0 | B0:B0 |
| TRACE_3 | | | | | | | | | | | | |
| SE_PC | 0:0 | 0:0 | 0:0 | 0:0 | 0:0 | 0:0 | 0:0 | 0:1 | 1:0 | 0:0 | 0:0 | 0:0 |
| SE_IPA | 0:0 | 0:0 | 0:0 | 0:0 | 0:0 | 0:0 | 0:0 | 0:0 | 0:0 | 0:1 | 1:0 | 0:0 |
| SE_IPE | 0:0 | 0:0 | 0:0 | 0:0 | 0:0 | 0:0 | 0:0 | 0:0 | 0:0 | 1:0 | 0:0 | 0:0 |
| TL_PC | 0:0 | 0:0 | 0:0 | 0:0 | 0:0 | 0:0 | 0:0 | 0:1 | 1:0 | 0:0 | 0:0 | 0:0 |
| TL_IPA | 0:0 | 0:0 | 0:0 | 0:0 | 0:0 | 0:0 | 0:0 | 0:0 | 0:0 | 0:1 | 1:0 | 0:0 |
| TL_IPE | 0:0 | 0:0 | 0:0 | 0:1 | 1:0 | 0:0 | 0:0 | 0:0 | 0:0 | 0:0 | 0:0 | 0:0 |

CODE:  A ─── A  
B ─── (PS1-PS5) ─── I  
C ─── J  
K  
L

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | Y:Z | Z:B | B:C | C:D | D:E | E:E | E:E | E:I | I:J | J:. | . | . |
| L_ADDRESS | Y:Y | Z:Z | B:B | C:C | . | . | . | . | . | . | . | . |
| IRA | X:Y | Y:Z | Z:B | B:PS1 | PS1:PS2 | PS2:PS3 | PS3:PS4 | PS4:PS5 | PS5:I | I:J | I:J | J:. |
| IRE | :X | :Y | :Z | Z:B | B:PS1 | PS1:PS2 | PS2:PS3 | PS3:PS4 | PS4:PS5 | PS5:I | I:J | J:. |
| IPA | X:Y | Y:Z | Z:B | B:C | C:D | D:D | D:D | D:D | D:I | I:J | I:J | . |
| IPE | :X | X:Y | Y:Z | Z:B | B:C | C:C | C:C | C:C | C:C | C:I | I:J | J:. |
| INTERRUPT | . | . | :INT | INT:INT | INT:INT | INT:INT | INT:INT | INT:INT | INT:INT | INT:INT | INT:INT | INT:INT |

| | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| TRACE_1 | | | | | :Z0 | B1:B1 Z0:Z0 | B1:B1 Z0:Z0 | B1:B1 Z0:Z0 | B1:B1 Z0:Z0 | B1:B1 Z0:Z0 | B1:I1 Z0:B1 :Z0 | I1:I1 B1:B1 Z0:Z0 |
| TRACE_2 | | | | | Z0:B1 :Z0 | | | | | | | |
| TRACE_3 | | | | :Z0 | | | | | | | | |
| SE_PC | 0:0 | 0:0 | 1:0 | 0:0 | 0:0 | 0:0 | 0:0 | 0:1 | 1:0 | 0:0 | 0:0 | 0:0 |
| SE_IPA | 0:0 | 0:0 | 0:1 | 1:0 | 0:0 | 0:0 | 0:0 | 0:0 | 0:1 | 1:0 | 0:0 | 0:0 |
| SE_IPE | 0:0 | 0:0 | 0:0 | 0:1 | 1:0 | 0:0 | 0:0 | 0:0 | 0:0 | 0:1 | 1:0 | 0:0 |
| TL_PC | 0:0 | 0:0 | 1:0 | 0:0 | 0:0 | 0:0 | 0:0 | 0:1 | 1:0 | 0:0 | 0:0 | 0:0 |
| TL_IPA | 0:0 | 0:0 | 1:1 | 0:0 | 0:0 | 0:0 | 0:0 | 0:0 | 0:1 | 1:0 | 0:0 | 0:0 |
| TL_IPE | 0:0 | 0:0 | 0:1 | 1:1 | 1:0 | 0:0 | 0:0 | 0:0 | 0:0 | 0:1 | 1:0 | 0:0 |

CODE:
X
Y
Z
BR B → B
— (PS1–PS5) → I
C
D
E
J

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :LD | LD:A | A:B | B:C | C:C | C:C | C:C | C:D | D:E | E:. | .:. | .:. |
| I_ADDRESS | .. | LD:LD | A:A | B:B | C:C | C:C | C:C | C:C | D:D | E:E | .:. | .:. |
| IRA | .. | :LD | LD:A | A:B | B:C | C:C | C:C | C:C | D:D | D:E | E:E | .:. |
| IRE | .. | .:. | :LD | LD:A | A:B | B:C | C:C | C:C | C:C | C:D | D:E | E:. |
| IPA | .. | :LD | LD:A | A:A | B:C | C:C | C:C | C:C | C:C | D:E | D:E | E:. |
| IPE | .. | .:. | .:. | LD:A | A:B | B:C | C:C | C:C | C:C | C:D | D:E | E:. |
| LOOPCOUNT | .. | .:. | .:. | .:3 | 3:2 | 2:1 | 1:0 | 0:. | .:. | .:. | .:. | .:. |

| | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| TRACE_1 | .. | .. | .. | .. | .. | .. | .. | C0:C1 | C1:C1 | C1:C1 | C1:C1 | C1:C1 |
| TRACE_2 | .. | .. | .. | .. | .. | .. | .. | :C0 | C0:C1 | C1:C1 | C1:C1 | C1:C1 |
| TRACE_3 | .. | .. | .. | .. | .. | .. | :C0 | .. | :C0 | C0:C1 | C1:C1 | C1:C1 |
| SE_PC | 0:0 | 0:0 | 0:0 | 0:0 | 0:1 | 1:1 | 1:1 | 1:0 | 0:0 | 0:0 | 0:0 | 0:0 |
| SE_IPA | 0:0 | 0:0 | 0:0 | 0:0 | 0:0 | 0:0 | 0:1 | 1:1 | 1:1 | 1:1 | 1:1 | 0:0 |
| SE_IPE | 0:0 | 0:0 | 0:0 | 0:0 | 0:0 | 0:0 | 0:0 | 0:1 | 1:1 | 0:1 | 0:0 | 0:0 |
| TL_PC | 0:0 | 0:0 | 0:0 | 0:0 | 0:1 | 1:1 | 1:1 | 1:1 | 1:1 | 1:1 | 0:0 | 0:0 |
| TL_IPA | 0:0 | 0:0 | 0:0 | 0:0 | 0:0 | 0:0 | 0:1 | 1:1 | 1:1 | 1:1 | 0:0 | 0:0 |
| TL_IPE | 0:0 | 0:0 | 0:0 | 0:0 | 0:0 | 0:0 | 0:0 | 0:1 | 1:1 | 0:1 | 0:0 | 0:0 |

*FIG. 10*

CODE: A
B
C
D
E

START AND END C    1 INSTRUCTION LOOP

FIG. 11

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | A:B | B:C | C:D | D:C | C:D | D:C | C:D | D:C | C:D | D:E | E:F | S:M |
| L_ADDRESS | A:A | B:B | C:C | D:D | C:C | D:D | C:C | D:D | C:C | D:D | E:E | F:F |
| IRA | LD:A | A:B | B:C | C:C | D:D | D:C | C:C | D:D | D:C | C:D | D:E | E:E |
| IRE | :LD | LD:A | A:B | B:C | C:D | C:C | D:C | C:C | D:C | C:C | D:C | D:E |
| IPA | LD:A | A:B | B:C | C:D | D:C | C:D | D:C | C:D | D:C | C:D | D:E | E:F |
| IPE | :LD | LD:A | A:B | B:C | C:D | C:C | D:C | C:C | D:C | C:C | D:C | D:E |
| LOOPCOUNT | | :3 | 3:3 | 3:2 | 2:2 | 2:1 | 1:1 | 1:0 | 0:0 | 0: | | |

| | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| TRACE_1 | | | | | | :D0 | D0:C1 | C1:D0 | D0:C1 | C1:D0 | D0:C1 | C1:C1 |
| TRACE_2 | | | | | | | :D0 | D0:C1 | C1:D0 | D0:C1 | C1:D0 | D0:D0 |
| TRACE_3 | | | | | | | | :D0 | D0:C1 | C1:D0 | D0:C1 | C1:C1 |
| SE_PC | 0:0 | 0:0 | 0:0 | 0:1 | 1:0 | 0:1 | 0:1 | 0:1 | 1:0 | 0:0 | 0:0 | 0:0 |
| SE_IPA | 0:0 | 0:0 | 0:0 | 0:0 | 0:1 | 1:0 | 1:0 | 1:0 | 0:1 | 1:0 | 1:0 | 0:0 |
| SE_IPE | 0:0 | 0:0 | 0:0 | 0:0 | 0:0 | 0:1 | 0:1 | 0:1 | 0:1 | 0:1 | 0:1 | 0:0 |
| TL_PC | 0:0 | 0:0 | 0:0 | 0:1 | 1:1 | 1:1 | 1:1 | 1:1 | 1:1 | 1:1 | 1:1 | 0:0 |
| TL_IPA | 0:0 | 0:0 | 0:0 | 0:0 | 0:1 | 1:1 | 1:1 | 1:1 | 1:1 | 1:1 | 1:1 | 0:0 |
| TL_IPE | 0:0 | 0:0 | 0:0 | 0:0 | 0:0 | 0:1 | 1:1 | 1:1 | 1:1 | 1:1 | 1:1 | 0:0 |

CODE:
A
B
C
D
E

START
END

2 INSTRUCTION LOOP

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:D | D:E | E:E | E:E | E:E | E:E | E:E | E:E | E:E |
| L_ADDRESS | .. | A:A | B:B | C:C | ab:ab | ab:ab | ab:ab | ab:ab | ab:ab | ab:ab | ab:ab | ab:ab |
| IRA | .. | :A | A:B | B:C | nu:nu | nu:nu | nu:nu | nu:nu | nu:nu | nu:nu | nu:nu | nu:nu |
| IRE | .. | .. | :A | A:B | B:nu | nu:nu | nu:nu | nu:nu | nu:nu | nu:nu | nu:nu | nu:nu |
| IPA | .. | :A | A:B | B:C | C:D | D:D | D:D | D:D | D:D | D:D | D:D | D:D |
| IPE | .. | .. | :A | A:B | B:C | C:C | C:C | C:C | C:C | C:C | C:C | C:C |
|  | .. | .. | .. | .. | .. | .. | .. | .. | .. | .. | .. | .. |
|  | .. | .. | .. | .. | .. | .. | .. | .. | .. | .. | .. | .. |
|  | .. | .. | .. | .. | .. | .. | .. | .. | .. | .. | .. | .. |

| | | | | | | | | | | | | |
|---|---|---|---|---|---|---|---|---|---|---|---|---|
| PC_CYC1 | 0:0 | 0:0 | 0:0 | 0:0 | 0:0 | 1:1 | 1:1 | 1:1 | 1:1 | 1:1 | 1:1 | 1:1 |
| PC_CYC0 | 0:0 | 0:0 | 0:0 | 0:0 | 0:0 | 1:1 | 1:1 | 1:1 | 1:1 | 1:1 | 1:1 | 1:1 |

| | | | | | | | | | | | | |
|---|---|---|---|---|---|---|---|---|---|---|---|---|
| | C:C | C:C | C:C | H:H | H:H | H:H | H:H | H:H | H:H | H:H | H:H | H:H |

*FIG. 14*

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | E:E | E:C | C:D | D:E | E:F | F:G | G:  | S:M | S:M | S:M | S:M | S:M |
| I_ADDRESS | ab: ab | ab: ab | C: C | D: D | E: E | F: F | G: G | : | : | : | : | : |
| IRA | nu: nu | nu: nu | nu: C | C: D | D: E | E: F | F: G | : | : | : | : | : |
| IRE | nu: nu | nu: nu | nu: nu | nu: C | C: D | D: E | E: F | : | : | : | : | : |
| IPA | D: D | D: E | E: C | C: D | D: E | E: F | F: G | : | : | : | : | : |
| IPE | C: C | C: D | D: E | E: C | C: D | D: E | E: F | : | : | : | : | : |
|  | : | : | : | : | : | : | : | : | : | : | : | : |
|  | : | : | : | : | : | : | : | : | : | : | : | : |
|  | : | : | : | : | : | : |  | : | : | : | : | : |

| | 1 | 2 | 3 | 4 | 5 | 6 | 7 | 8 | 9 | 10 | 11 | 12 |
|---|---|---|---|---|---|---|---|---|---|---|---|---|
| PC_CYC1 | 1:1 | 1:1 | 1:0 | 0:0 | 0:0 | 0:0 | 0:0 | 0:0 | 0:0 | 0:0 | 0:0 | 0:0 |
| PC_CYC0 | 1:1 | 1:1 | 0:0 | 1:1 | 0:0 | 0:0 | 0:0 | 0:0 | 0:0 | 0:0 | 0:0 | 0:0 |

| H:H | C:C | C:C | C:C | C:C | C:C | C:C | C:C | C:C | C:C | C:C | C:C |
|---|---|---|---|---|---|---|---|---|---|---|---|

*FIG. 15*

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:A | A:B | B:B | S:B | B:C | C:A | A:B | B:C | C:A |
| I_ADDRESS | . . | A:A | B:B | C:ab | ab:ab | ab:ab | ab:ab | ab:ab | C:C | A:A | B:B | C:C |
| IRA | . . | . :A | A:B | B:nu | nu:nu | nu:nu | nu:nu | nu:nu | nu:C | C:A | A:B | B:C |
| IRE | . . | . . | . :A | A:B | B:nu | nu:nu | nu:nu | nu:nu | nu:nu | nu:C | C:A | A:B |
| IPA | . . | . :A | A:B | B:C | C:A | A:A | A:A | A:B | B:C | C:A | A:B | B:C |
| IPE | . . | . . | . :A | A:B | B:C | C:C | C:C | C:A | A:B | B:C | C:A | A:B |
| LOOPCOUNT | 3:3 | 3:3 | 3:3 | 3:2 | 2:2 | 2:2 | 2:2 | 2:2 | 2:2 | 2:2 | 2:2 | 2:1 |
| | | | | | | | | | | | | . . |
| | | | | | | | | | | | | . . |

| PC_CYC1 | 0:0 | 0:0 | 0:0 | 0:0 | 0:0 | 1:1 | 1:1 | 1:1 | 1:1 | 0:0 | 0:0 | 0:0 |
| PC_CYC0 | 0:0 | 0:0 | 0:0 | 0:0 | 0:0 | 1:1 | 1:1 | 1:1 | 0:0 | 1:1 | 0:0 | 0:0 |

| | C:C | C:C | C:C | H:H | H:H | H:H | H:H | C:C | C:C | C:C | C:C | C:C |

FIG. 16

CODE:
START A ⎫
        B ⎬ 3 INSTRUCTION LOOP
END    C ⎭

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:D | D:E | E:E | E:E | E:I1 | I1:I2 | I2:I3 | I3:I3 | I3:I3 |
| I_ADDRESS | | A:A | B:B | C:C | D:D | ab:ab | ab:ab | ab:ab | I1:ab | ab:ab | ab:ab | ab:ab |
| IRA | | :A | A:B | B:PS1 | PS1:PS2 | PS2:PS3 | PS3:PS4 | PS4:PS5 | PS5:nu | nu:nu | nu:nu | nu:nu |
| IRE | | | :A | A:B | B:PS1 | PS1:PS2 | PS2:PS3 | PS3:PS4 | PS4:PS5 | PS5:nu | nu:nu | nu:nu |
| IPA | | :A | A:B | B:C | C:D | D:D | D:D | D:D | D:I1 | I1:I2 | I2:I2 | I2:I2 |
| IPE | | | :A | A:B | B:C | C:C | C:C | C:C | C:C | C:I1 | I1:I1 | I1:I1 |
| | | | | | | | | | | | | |
| INTERRUPT | : | : | :INT | INT:INT | INT:INT | INT:INT | INT:INT | INT:INT | INT:INT | INT:INT | INT:INT | INT:INT |
| | : | : | : | : | : | : | : | : | : | : | : | : |

| PC_CYC1 | 0:0 | 0:0 | 0:0 | 0:0 | 0:0 | 0:0 | 0:0 | 0:0 | 0:0 | 0:0 | 1:1 | 1:1 |
| PC_CYC0 | 0:0 | 0:0 | 0:0 | 0:0 | 0:0 | 0:0 | 0:0 | 0:0 | 0:0 | 0:0 | 1:1 | 1:1 |

| | C:C | C:C | C:C | C:C | C:C | H:H | H:H | H:H | H:H | H:H | H:H | H:H |

*FIG. 17*

CODE:
A
B  —(PS1–PS5)→ I1
C                I2

| TIME → | 1 S : M | 2 S : M | 3 S : M | 4 S : M | 5 S : M | 6 S : M | 7 S : M | 8 S : M | 9 S : M | 10 S : M | 11 S : M | 12 S : M |
|---|---|---|---|---|---|---|---|---|---|---|---|---|
| PC | C : C | C : C | C : A | A : B | B : C | C : C | C : C | C : 11 | 11 : 12 | 12 : 13 | 13 : 14 | 14 : 15 |
| I_ADDRESS | ab: ab | ab: ab | ab: ab | A : A | ab: ab | ab: ab | ab: ab | ab: ab | 11: 11 | 12: 12 | 13: 13 | 14: 14 |
| IRA | nu: nu | nu: nu | nu: nu | nu:PS1 | PS1:PS2 | PS2:PS3 | PS3:PS4 | PS4:PS5 | PS5: 11 | 11: 12 | 12: 13 | 13: 14 |
| IRE | nu: nu | nu: nu | nu: nu | nu: nu | nu:PS1 | PS1:PS2 | PS2:PS3 | PS3:PS4 | PS4:PS5 | PS5: 11 | 11: 12 | 12: 13 |
| IPA | B : B | B : B | B : C | C : A | A : B | B : B | B : B | B : B | B : 11 | 11 : 12 | 12 : 13 | 13 : 14 |
| IPE | A : A | A : A | A : B | B : C | C : A | A : A | A : A | A : A | A : A | A : 11 | 11 : 12 | 12 : 13 |
| | .. | .. | .. | .. | .. | .. | .. | .. | .. | .. | .. | .. |
| INTERRUPT | :INT | INT:INT | INT:INT | INT:INT | INT:INT | INT:INT | INT:INT | INT:INT | INT:INT | INT:INT | INT:INT | INT:INT |
| | .. | .. | .. | .. | .. | .. | .. | .. | .. | .. | .. | .. |

| | 1 | 2 | 3 | 4 | 5 | 6 | 7 | 8 | 9 | 10 | 11 | 12 |
|---|---|---|---|---|---|---|---|---|---|---|---|---|
| PC_CYC1 | 1 : 1 | 1 : 1 | 1 : 1 | 1 : 1 | 0 : 1 | 0 : 0 | 0 : 0 | 0 : 0 | 0 : 0 | 0 : 0 | 0 : 0 | 0 : 0 |
| PC_CYC0 | 1 : 1 | 1 : 1 | 1 : 1 | 0 : 0 | 1 : 1 | 0 : 0 | 0 : 0 | 0 : 0 | 0 : 0 | 0 : 0 | 0 : 0 | 0 : 0 |

| | 1 | 2 | 3 | 4 | 5 | 6 | 7 | 8 | 9 | 10 | 11 | 12 |
|---|---|---|---|---|---|---|---|---|---|---|---|---|
| | H : H | H : H | C : C | C : C | C : C | C : C | C : C | C : C | C : C | C : C | C : C | C : C |

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:D | D:E | E:E | E:C | C:D | D:E | E:F | F:F | F:F |
| L_ADDRESS | . | A:A | B:B | C:D | D:E | E:E | E:C | C:C | D:E | E:F | F:F | F:F |
| IRA | . | . | B:B | C:ob | ob:ob | ob:ob | ob:ob | C:C | D:ob | ob:ob | ob:ob | ob:ob |
| IRE | . | :A | A:B | B:nu | nu:nu | nu:nu | nu:nu | nu:C | C:nu | nu:nu | nu:nu | nu:nu |
|  | . | . | :A | A:B | B:nu | nu:nu | nu:nu | nu:nu | nu:C | C:nu | nu:nu | nu:nu |
| IPA | . | . | A:B | B:C | C:D | D:D | D:E | E:E | C:C | D:E | E:E | E:E |
| IPE | . | . | :A | A:B | B:C | C:C | C:D | D:E | E:C | C:D | D:D | D:D |
|  | . | . | . | . | . | . | . | . | . | . | . | . |
|  | . | . | . | . | . | . | . | . | . | . | . | . |

| PC_CYC1 | 0:0 | 0:0 | 0:0 | 0:0 | 0:0 | 1:1 | 1:1 | 1:1 | 0:0 | 0:0 | 1:1 | 1:1 |
| PC_CYC0 | 0:0 | 0:0 | 0:0 | 0:0 | 0:0 | 1:1 | 1:1 | 0:0 | 1:1 | 0:0 | 1:1 | 1:1 |

| | C:C | C:C | C:C | H:H | H:H | H:H | C:C | H:H | H:H | H:H | H:H | H:H |

| TIME → | 1 S:M | 2 S:M | 3 S:M | 4 S:M | 5 S:M | 6 S:M | 7 S:M | 8 S:M | 9 S:M | 10 S:M | 11 S:M | 12 S:M |
|---|---|---|---|---|---|---|---|---|---|---|---|---|
| PC | :A | A:B | B:C | C:D | D:T | T:T | T:T | T:C | C:D | D:T | T:U | U:V |
| I_ADDRESS | | :A | B:B | C:D | ab:ab | ab:ab | ab:ab | T:C | C:C | D:D | T:T | U:U |
| IRA | | :A | A:B | B:B | nu:nu | nu:nu | nu:nu | ab:ab | C:C | D:D | T:T | U:T |
| IRE | | | :A | A:B | B:B | nu:nu | nu:nu | nu:nu | nu:C | nu:C | D:T | T:T |
| IPA | | :A | A:B | B:C | C:C | D:D | D:D | D:T | T:C | C:C | D:D | D:T |
| IPE | | | :A | A:B | B:C | C:C | C:C | C:C | T:C | T:C | C:D | T:T |

| PC_CYC1 | 0:0 | 0:0 | 0:0 | 0:0 | 0:0 | 1:1 | 1:1 | 1:1 | 1:1 | 0:0 | 0:0 | 0:0 |
| PC_CYC0 | 0:0 | 0:0 | 0:0 | 0:0 | 0:0 | 1:1 | 1:1 | 1:1 | 0:0 | 1:1 | 0:0 | 0:0 |

| C:C | C:C | C:C | H:H | H:H | H:H | H:H | C:C | C:C | C:C | C:C | C:C |

CODE:
A
B BR T → T
C       U
D       V

PIPELINED DATA PROCESSING INCLUDING PROGRAM COUNTER RECYCLING

This application is a Continuation of application Ser. No. 08/180,400 filed Jan. 11, 1994, now abandoned.

CROSS-REFERENCE TO RELATED DOCUMENTS

The related coassigned patent documents listed below are hereby incorporated herein by reference.

| PTO Reference | Effective Filing Date |
| --- | --- |
| Ser. No. 07/832,661 | 07/31/1989, pending |
| Ser. No. 07/830,110 | 07/31/1989, U.S. Pat. No. 5,535,331 |
| Ser. No. 08/179,865 | Concurrent herewith, now U.S. Pat. No. 5,564,028 |
| Ser. No. 08/180,172 | Concurrent herewith, Abandoned |

FIELD OF THE INVENTION

This invention relates generally to data processing devices having pipelined architectures and, more specifically, to apparatus and methods for managing program flow discontinuities therein.

BACKGROUND OF THE INVENTION

A well known technique for debugging the operation of data processor based systems is tracing the instructions executed by the data processor during a specified time interval or until a specified hardware or software breakpoint occurs. It is advantageous to trace only those instructions which are actually executed during the trace period. However, this can be difficult in data processors which utilize pipelined architectures. More specifically, when a branch instruction is encountered in a pipelined architecture, the processor must generally handle a number of intervening instructions before the branch can actually be taken. The number of intervening instructions is a function of the pipeline length, the longer the pipeline the more intervening instructions. Each intervening instruction is said to occupy a delay slot in the execution of the branch instruction, because the processing of each intervening instruction represents a delay in the ultimate execution of the branch instruction.

In many pipelined architectures, the branch instruction opcode itself has a bit set aside to annul execution of the intervening instructions. In addition, some emulation features may cause execution to be halted. In both instances, the processor may fetch instructions which are never executed. Therefore, if it is desired to trace only those instructions which are actually executed, then the aforementioned instructions which are fetched but never executed should not be traced.

It is therefore desirable to provide a pipelined data processing device which is capable of selectively tracing only those instructions which are actually executed.

It is further desirable to reduce the number of executed instructions which are actually traced in order to reduce the amount of hardware needed for storage of the traced instructions.

As discussed above, when a branch instruction is introduced into a data processor having a pipelined architecture, before the branch can be taken the processor must generally handle one or more intervening instructions during one or more delay slots. If processor execution is stopped (e.g. emulation halt, interrupt) during a delay slot, the branch instruction is lost before the branch is taken. For this reason, pipelined architectures generally prohibit interrupts, traps etc. during delay slots of branch instructions, which disadvantageously complicates programming rules and processor design.

It is therefore desirable to provide a pipelined data processor which can be stopped during a delay slot of a branch instruction without losing the branch information. According to the present invention, an address pipeline is provided to hold the addresses of the instructions presently in the instruction pipeline. The address pipeline facilitates tracing only executed instructions, and permits stopping the data processor during a branch delay slot without losing the branch information.

BRIEF DESCRIPTION OF THE DRAWINGS

FIG. 5 is a timing diagram which illustrates the trace operation of the present invention when sequential branches are executed;

FIG. 7 is a timing diagram which illustrates the trace operation of the present invention when an interrupt occurs;

FIG. 8 is a timing diagram which illustrates the trace operations of the present invention when an interrupt occurs during a delay slot of a branch instruction;

FIG. 9 is a timing diagram which illustrates the trace operation of the present invention when an interrupt occurs after the execution of a branch instruction;

FIG. 10 is a timing diagram which illustrates the trace operation of the present invention during execution of a one instruction loop;

FIG. 11 is a timing diagram which illustrates the trace operation of the present invention during execution of a two instruction loop;

FIG. 14 is a timing diagram which illustrates the emulation halt operation of the present invention;

FIG. 15 is a timing diagram which illustrates the restart operation of the present invention after an emulation halt has occurred;

FIG. 16 is a timing diagram which illustrates the restart operation of the present invention after an emulation halt has occurred during the execution of a program loop;

FIG. 17 is a timing diagram which illustrates the operation of the present invention when an emulation halt occurs during an interrupt;

FIG. 18 is a timing diagram which illustrates the restart operation of the present invention after an interrupt has occurred during the emulation halt mode;

FIG. 19 is a timing diagram which illustrates the emulation single step operation of the present invention;

DETAILED DESCRIPTION

Figure 1:
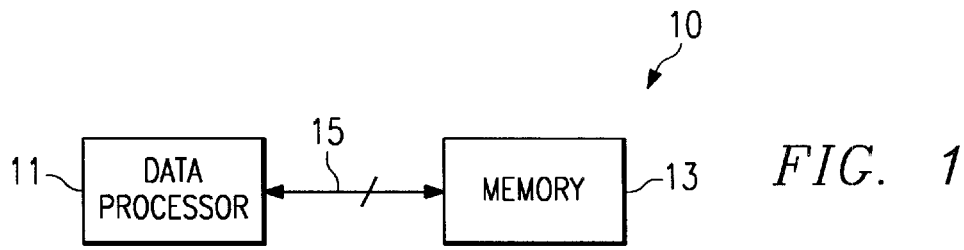
FIG. 1 is a block diagram of a data processing device according to the present invention.

FIG. 1 illustrates an exemplary embodiment of an electronic data processing device 10 according to the present invention. The data processing device 10 includes an electronic data processor 11 having a pipelined architecture, and an electronic memory device 13. The data processor 11 and memory 13 are interconnected by a plurality of address lines, data lines and control lines, schematically illustrated at 15 in FIG. 1. Although data processors having pipelined architectures are generally known in the art, an exemplary pipelined architecture of data processor 11 will now be described with reference to FIGS. 2–4 to facilitate explanation of the present invention.

Figure 2:
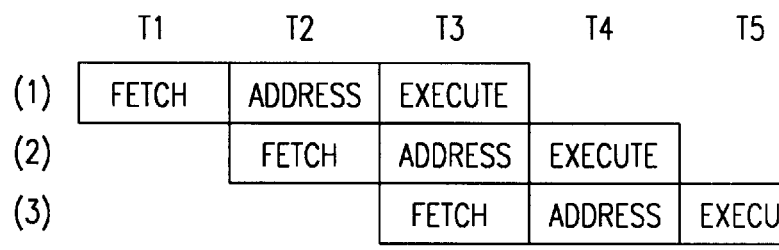
FIG. 2 is a timing diagram which illustrates the instruction pipeline of the data processing device of FIG. 1.

Referring to FIG. 2, exemplary data processor 11 has an exemplary three stage pipeline including a fetch stage, an address stage sequentially following the fetch stage, and an execute state sequentially following the address stage. FIG. 2 illustrates three instructions in the pipeline. During time period T1, instruction 1 is in the fetch stage; during time period T2, instruction 1 is in the address stage while instruction 2 is in the fetch stage; and during time period T3, instruction 1 is in the execute stage, instruction 2 is in the address stage and instruction 3 is in the fetch stage. As is well known in the art and clearly evident from FIG. 2, a pipelined architecture increases the throughput of the data processor 11 by permitting the data processor 11 to begin processing the next sequential instruction while a current instruction is still being processed.

Figure 4:
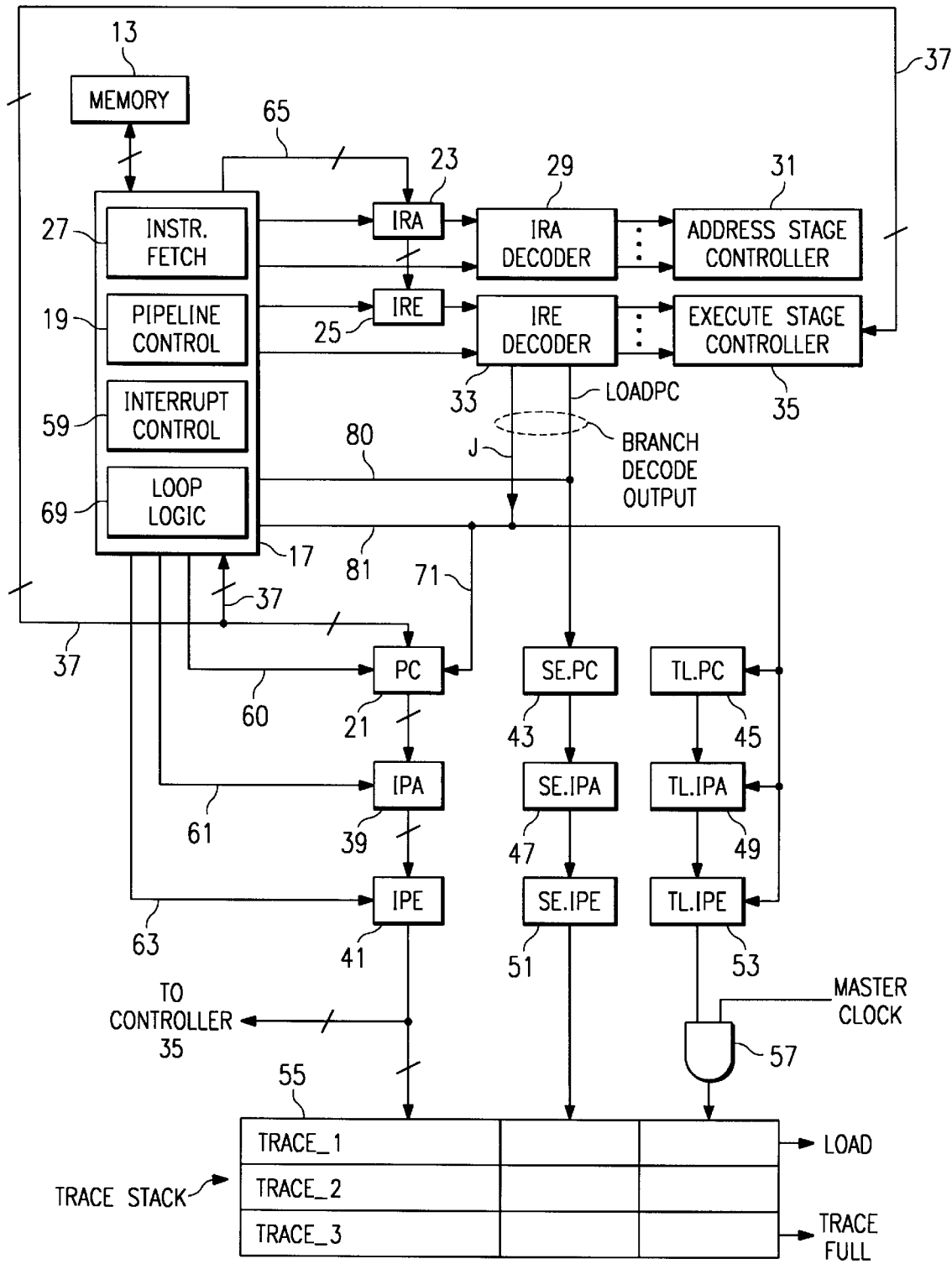
FIG. 4 is a block diagram which illustrates an exemplary embodiment of the data processing device of FIG. 1.

FIG. 4 illustrates one exemplary implementation of the pipeline of FIG. 2 in data processor 11. More specifically, data processor 11 includes program flow control 17 which in turn includes a pipeline controller 19. The three stage pipeline of FIG. 2 is implemented in FIG. 4 using three registers, namely, a program counter (PC) 21, an instruction register IRA 23 for the address pipeline stage, and an instruction register IRE 25 for the execute pipeline stage. Under control of pipeline controller 19, these three registers interact to implement the pipeline of FIG. 2. This interaction is described below.

The program counter 21 holds the address of the instruction to be fetched during the fetch stage and is normally incremented after the current fetch operation is completed. During the fetch stage, the instruction fetch portion 27 of program flow control 17 performs a fetch cycle wherein it fetches from memory 13 the instruction residing at the address contained in program counter 21. At the end of the fetch pipeline stage, the program counter 21 is incremented and the IRA 23 is loaded via bus 65 with the instruction fetched from memory 13 during the fetch cycle.

During the address pipeline stage, the instruction in the IRA 23 is decoded by an IRA decoder 29 whose output is provided to an address stage controller 31. If the instruction in the IRA 23 requires any memory accesses, then the address stage controller 31 generates the required memory addresses during the address pipeline stage.

At the end of the address pipeline stage, the instruction in the IRA 23 is passed into the IRE 25. The IRE 25 is connected to an IRE decoder 33 whose output is connected to an execute stage controller 35 which effects execution of the instruction in IRE 25 during the execute pipeline stage.

Figure 3:
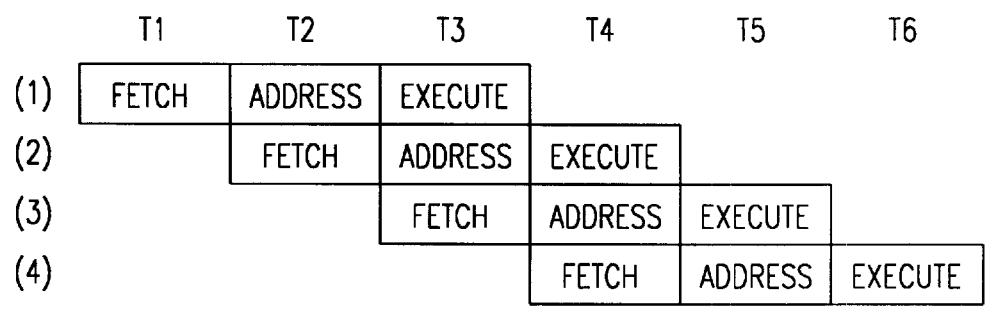
FIG. 3 is a timing diagram which illustrates the manner in which a branch instruction is executed in the instruction pipeline of the data processing device of FIG. 1.

Returning now to FIG. 2, if instruction 1 is a branch instruction, then during the execute stage at T3, the IRE decoder 33 will cause the program counter 21 to be loaded from a branch address calculated by the execute stage controller 35 and provided to the program counter 21 on bus 37. Thus, when a branch instruction is executed, the program counter 21 is not incremented as usual, but rather is loaded with a new, out-of-sequence address specified by the branch instruction. Referring now to FIG. 3, instruction 4 resides at this new address and is fetched during time period T4 and ultimately executed during time period T6. Thus, there is a delay between the time that branch instruction 1 is executed at T3 and the time that desired instruction 4 is actually executed at T6. The delay associated with the branch instruction is three clock cycles, equal to the length of the pipeline in the disclosed exemplary embodiment.

This three cycle delay arises from the fact that the address of desired instruction 4 is not loaded into the program counter 21 until T4, after execution of branch instruction 1 at T3. Time slots T2 and T3 are referred to as delay slots of branch instruction 1 because these time slots are necessary to effect loading of the program counter 21 with new, non-sequential instruction 4 as dictated by branch instruction 1. Another way of viewing this is that, even though the program counter is loaded with the address of instruction 4 at T3, intervening instructions 2 and 3 are executed respectively at T4 and T5 before instruction 4 is ultimately executed at T6. It is generally disadvantageous to execute intervening instructions 2 and 3, and execution of these intervening instructions is in fact annulled in many pipelined architectures.

For example, an assembler can be suitably arranged to insert a NOP (no-operation) instruction in each delay slot, or the branch instruction opcode itself can have a bit reserved to annul execution of the intervening instructions. In such instances, intervening instructions 2 and 3 would be fetched during the delay slots T2 and T3, but never actually executed. Because neither of these intervening instructions is actually executed, they should preferably not be traced during the process of debugging the functional operation of the electronic data processor 11.

Speaking more generally, any type of halt during an emulation-controlled run, such as halts caused by hardware or software breakpoints, can prevent execution of previously fetched instructions, even where no branch instructions or branch delay slots are involved. As indicated above, instructions which are not executed should not be traced.

Referencing FIG. 4, one exemplary embodiment of data processor 11 is capable of tracing only discontinuities in the sequence of addresses which pass through the program counter 21, and furthermore, the address discontinuity is traced only if the corresponding instruction is actually executed. Instruction pointer registers IPA 39 and IPE 41 are provided to maintain a record of the address from which the instructions in the pipeline (i.e. in IRA 23 and IRE 25) have been fetched. Each time that the pipeline advances, the IPA 39 is loaded with the previous value of the program counter 21. Thus, the IPA 39 contains the address from which was fetched the instruction currently held in IRA 23 and currently being processed in the address stage of the pipeline. Similarly, the IPE 41 is loaded with the previous value of the IPA 39 each time that the pipeline advances. Thus, the IPE 41 contains the address from which was fetched the instruction currently held in IRE 25 and currently being processed in the execute stage of the pipeline. The IPE 41 is also useful for performing program counter-relative calculations because the value of the program counter itself cannot always be reliably used due to branches, loops and interrupts. Thus, the output of IPE 41 can be supplied to execute stage controller 35 as shown for use in PC-relative calculations.

The IPA 39 and IPE 41 are referred to as history registers because they contain a history of the last two program counter addresses. Referring again to FIG. 2, during time slot T3, the program counter 21 holds the address of instruction 3 which is currently being fetched, the IPA 39 holds the address of instruction 2 while the IRA 23 holds instruction 2 itself, and the IPE 41 holds the address of instruction 1 while the IRE 25 holds instruction 1 itself for execution. Thus, at any given time, the program counter 21 holds the address of the instruction being fetched, the IPA 39 holds the address of the instruction in the IRA 23, and the IPE 41 holds the address of the instruction in the IRE 25, whereby the instructions (by virtue of IRA 23 and IRE 25) advance through an "instruction pipeline" and their addresses (by virtue of IPA 39 and IPE 41) advance through an "address pipeline".

The program counter 21, IPA 39 and IPE 41 are each provided with two additional bits. More specifically, flip flops 43 and 45 provide two additional bits for use in conjunction with program counter 21, flip flops 47 and 49 provide two additional bits for use in conjunction with IPA 39, and flip flops 51 and 53 provide two additional bits for use in conjunction with IPE 41. Each of the aforementioned sets of two bits advances along the pipeline with the corresponding address. The flip flops 45, 49 and 53 are used to indicate whether or not the corresponding instruction address represents a discontinuity in the sequence of program counter addresses. The flip flops 43, 47 and 51 are used to indicate whether the corresponding address represents the first instruction of a new block of sequential instructions yet to be executed or the last instruction of a block of sequential instructions currently being executed. If the address represents the first instruction of a new block of instructions, then the corresponding flip flop 43, 47 or 51 will contain a logic 1, signifying a start of block, otherwise the corresponding flip flop will contain a logic 0 signifying an end of block. Thus, the bits implemented by flip flops 43, 47 and 51 are referred to as start/end bits, and are denominated herein as shown in FIG. 4, namely SE_PC for flip flop 43, SE_IPA for flip flop 47, and SE_IPE for flip flop 51. The bits implemented by flip flops 45, 49 and 53 are referred to as trace load bits, because they determine whether the corresponding address should be loaded into trace stack 55. The trace load bits are denominated as shown in FIG. 4, namely TL_PC for flip flop 45, TL_IPA for flip flop 49 and TL_IPE for flip flop 53. The trace load bits are set only when the corresponding address represents a program counter discontinuity, thereby permitting selective loading of only discontinuities into the trace stack 55.

When a branch instruction reaches the execute stage of the pipeline, the IRE decoder 33 outputs a LOAD PC signal to flip flop 43, and also produces an output J which initiates a program counter load. The signal J drives a load control input 71 of program counter 21, and causes the program counter 21 to be loaded with an address calculated by the execute stage controller 35 and provided to the program counter 21 via bus 37. The signal J also sets TL_PC of flip flop 45 to signify that the address in program counter 21 represents a program discontinuity. The LOAD PC output of the IRE decoder 33 sets SE_PC of flip flop 43 whenever a branch is executed, thereby indicating that the address being loaded into program counter 21 is the start of a new block of sequential addresses. Also when a branch instruction reaches IRE 25, the signal J sets TL_IPA of flip flop 49, but SE_IPA of flip flop 47 is not set, thus indicating IPA 39 contains an address discontinuity, which discontinuity represents the end of a block of sequential instructions. When an instruction that does not load the PC 21 reaches the execute stage of the pipeline, SE_PC and TL_PC are cleared by the LOADPC and J signals.

As the pipeline advances, the contents of IPE 41 and flip flops 51 and 53 are pushed onto trace stack 55 only if flip flop 53 is set. That is, upon the occurrence of master clock, AND gate 57 is qualified so that the value of TL_IPE (contents of flip flop 53) determines whether the output of AND gate 57 is high to permit pushing data onto trace stack 55 or low to prohibit pushing data. The trace stack illustrated in FIG. 4 is a three deep stack including locations TRACE_1, TRACE_2 and TRACE_3, but a trace stack of any desired size can be used.

Figure 6:
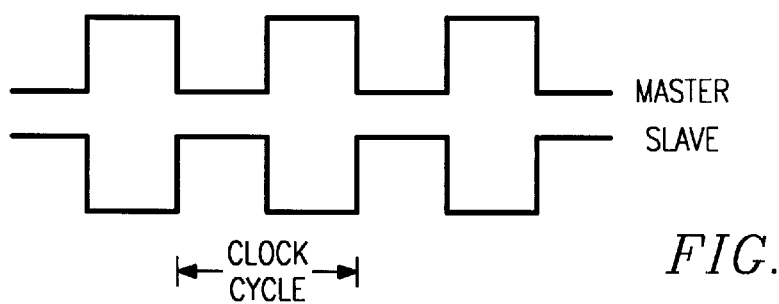
FIG. 6 illustrates a two phase clock utilized by the present invention.
Figure 5:
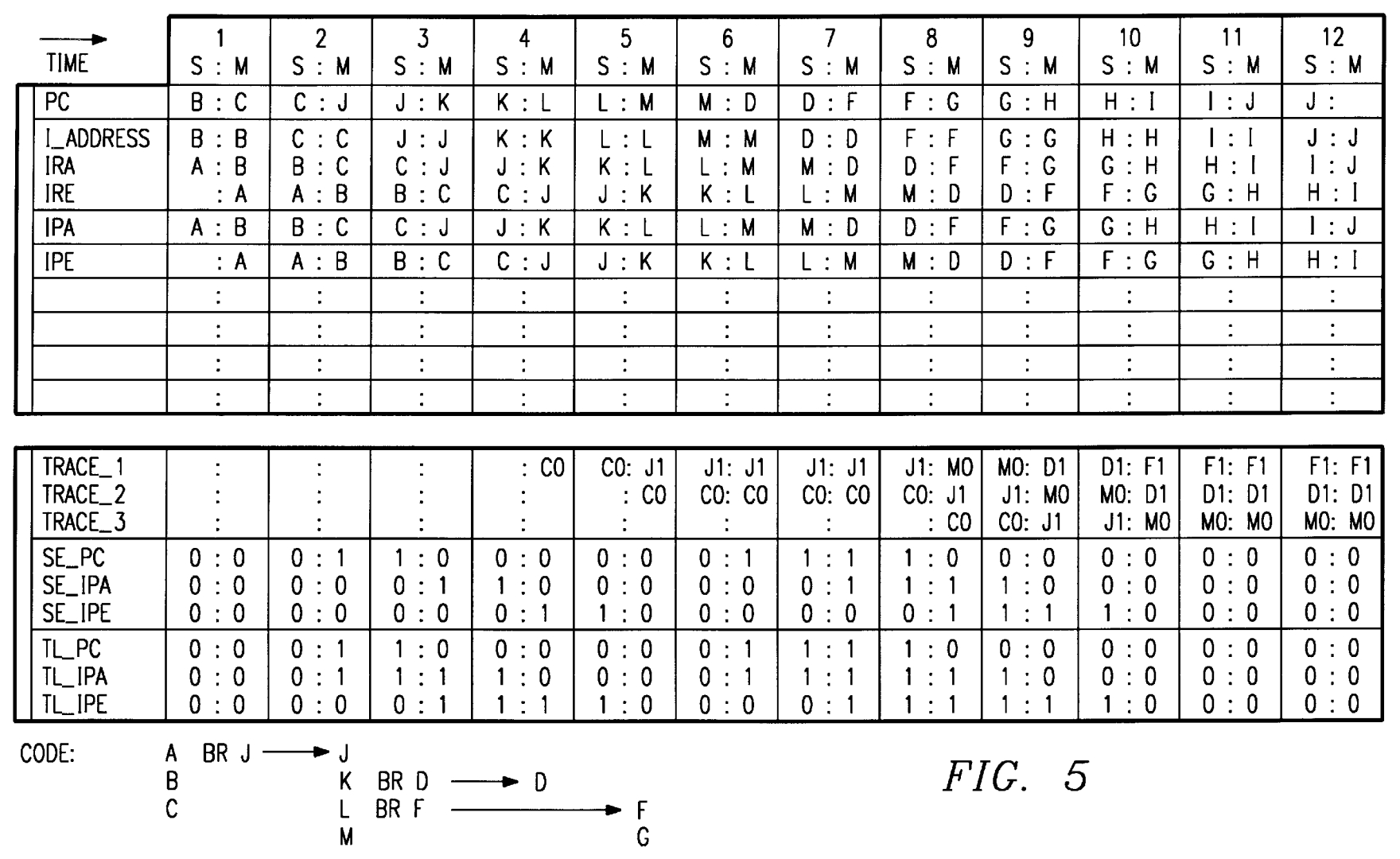

FIG. 5 is a timing diagram which illustrates the trace operation of the present invention during execution of branch instructions. The symbols S and M along the time line of FIG. 5 represent, in this example, the respective rising edges of the slave and master phases of a two phase clock as illustrated in FIG. 6. The two phase clock of FIG. 6 advantageously provides two rising edges during each clock cycle as shown.

The data processor 11 can be placed in a trace mode in any convenient conventional manner, such as using an external emulation control unit in conjunction with a test port of the data processor 11 to provide pipeline controller 19 with a command to trace until a specified breakpoint (such as an instruction address) is encountered. When the trace is finished, in this example when the breakpoint is encountered, the pipeline controller 19 can inhibit further trace stack loading by, for example, holding TL_IPE at logic 0.

Referring again to FIG. 5, the code to be executed by the data processor 11 is diagramed below the timing diagram. The instruction at address A is a branch to address J, and is sequentially followed in program memory by instructions at addresses B and C. The instruction at J is sequentially followed by the instruction at address K, which instruction is a branch to address D. The instruction at K is followed sequentially in program memory by instructions at addresses L and M, and the instruction at L is a branch to address F. The instruction at F is sequentially followed in program memory by an instruction at address G. The symbol I_address used in the timing diagram of FIG. 5 designates the address of the instruction currently being fetched. The remaining symbols used in the leftmost column of FIG. 5 have been discussed above in connection with FIG. 4.

On the master clock edge of clock cycle No. 1 in FIG. 5, the program counter is incremented from address B to address C, the fetch of the instruction at B is completed leaving that instruction in IRA, and the instruction at A is advanced from IRA to IRE. Also with the master edge of clock cycle No. 1, the address B is advanced into IPA and the address A is advanced into IPE. Thus, at the end of clock cycle No. 1, the instruction at A has advanced to the execution stage of the pipeline, the instruction at B has advanced to the address stage of the pipeline, and the program counter is ready for a fetch of the instruction at C. The address B contained in IPA and the address A contained in IPE provide a history of the two most recent program counter addresses prior to C.

At the end of clock cycle No. 2, the branch instruction at A has been executed, causing the program counter to be loaded with the address J rather than permitting the program counter to be incremented. At this time also, the fetch of the instruction at C has been completed so that IRA contains the instruction at C and IPA contains C, and the instruction at B has advanced into IRE while address B has advanced into IPE. During execution of the branch instruction at A, the branch decode outputs in FIG. 4, namely J and LOAD PC cause SE_PC, TL_PC and TL_IPA to be set on the master edge of clock cycle No. 2 as the program counter is being loaded with address J. TL_PC and TL_IPA are both set by output J from IRE decoder 33, because the addresses in the IPA 39 and the program counter 21 define a program counter address discontinuity inasmuch as the address J contained in program counter 21 does not sequentially follow the address C contained in IPA 39. Because the addresses in IPA 39 and program counter 21 define a discontinuity, the corresponding trace load bits TL_IPA and TL_PC are set by IRE decoder output J so that these addresses will be pushed onto the trace stack (provided that the corresponding instructions proceed through the execute stage of the pipeline). It is therefore advantageous that the trace load flip flops for TL_PC, TL_IPA and TL_IPE are all loaded by signal J from IRE decoder 33. SE_PC is set by signalset by signal LOAD PC on the master edge of clock cycle No. 2, indicating that the address in the program counter, namely J, represents the start of a new block of sequential addresses.

By the end of clock cycle No. 3, the fetch at J has been completed and the instruction at J has been loaded into the IRA, address J has been sequenced from PC into IPA, the program counter has been incremented to address K, the instruction at B has been executed, and the instruction at C has been sequenced into IRE with corresponding address C sequenced into IPE. Also, the start/end bit and the trace load bits which were set in clock cycle No. 2 have now advanced one pipeline stage. At the end of clock cycle No. 4, the instruction at C has been executed and address C has been advanced from IPE into position TRACE_1 of trace stack 55. More specifically, because TL_IPE is a logic 1 at the end of clock cycle 3 while C is in IPE and its corresponding instruction is in IRE, once the instruction at C is executed during clock cycle No. 4, C is pushed from IPE 41 onto trace stack 55 along with the contents of flip flop 51 (SE_IPE). When address C was contained in IPE, the corresponding start/end bit SE_IPE was 0 (see end of clock cycle No. 3), so a 0 is pushed onto the trace stack 55 along with address C, thereby signifying that the pushed address represents the end of a block of sequential addresses.

At the end of clock cycle No. 4, address J is contained in IPE while the corresponding start/end bit SE_IPE and the corresponding trace load bit TL_IPE are both set to logic 1. The instruction at J is executed during clock cycle No. 5, and address J is pushed onto the trace stack along with the start/end bit set to logic 1 to indicate that this address is a start address of a new block of sequential addresses.

At the end of clock cycle No. 6, the branch instruction at K has been executed, loading the program counter with D. TL_PC, TL_IPA and SE_PC are also set to indicate that addresses M and D are to be pushed onto the trace stack when the corresponding instruction is executed, M defining an end of block and D defining a start of block.

At the end of clock cycle No. 7, the branch instruction at L has been executed loading the program counter with F. The start/end and trace load bits set in clock cycle No. 6 have been advanced by one stage in the pipeline, and TL_PC and SE_PC have been set to indicate that F represents a start of block. Ordinarily, when the branch instruction at L is executed and the program counter is loaded with F, the IRE decoder output J would set TL_IPA on the master edge of clock cycle No. 7 to indicate that the address in IPA, namely D, defines a program counter discontinuity. However, the trace load bit and the start/end bit corresponding to D were already set during clock cycle No. 6 to indicate that D is a start address of a new block. These bits advance through the pipeline with D so that the trace load bit corresponding to D, which would ordinarily be set when the branch instruction at L is decoded, is already set by virtue of advancement of the pipeline. Thus, the trace load bits and start/end bits at the end of clock cycle 7 identify M as an end of block, D as a start of block, and F as a start of block. This handling of the sequential branches to D and F eliminates the necessity of identifying D as both a start address and an end address.

During clock cycle No. 8, the instruction at M is executed and M advances from IPE onto the trace stack along with its corresponding start/end bit (SE_IPE=0). During clock cycle No. 9, the instruction at D is executed and D advances from IPE onto the trace stack along with the corresponding start/end bit (SE_IPE=1). During clock cycle No. 10, the instruction at F is executed and F advances from IPE onto the trace stack along with its corresponding start/end bit (SE_IPE=1).

To summarize the trace stack activity in the example of FIG. 5, C was pushed as an end of block, J as a start of block, M as an end of block, D as a start of block, and F as a start of block. Although not shown in FIG. 5, the trace load bits may also be pushed onto the trace stack 55 as indicated in FIG. 4. As previously discussed, the trace stack 55 is not pushed unless TL_IPE of flip flop 53 is set, so that each time the trace stack 55 is pushed, a 1 would be pushed onto the trace stack from flip flop 53. The trace stack 55 can be provided with a trace full output produced by trace logic when the first trace load bit reaches the bottom of the trace stack 55. The trace full output can then be used to initiate a stop request to, for example, stop the trace operation or halt the processor. The trace stack 55 has a second output, namely a load output which is driven active each time a start/end bit having a value of logic 1 is pushed onto trace stack 55. The load output can be used to determine when a predetermined number of start of block addresses has been pushed onto the trace stack, and the processor can be stopped when the predetermined number is reached.

As can be seen from FIGS. 4 and 5, the flip flops for the start/end and trace load bits are initially cleared, and flip flops 43 (SE_PC) and 45 (TL_PC) are cleared whenever an instruction is executed that does not cause a program counter discontinuity. To distinguish whether or not the trace stack locations TRACE_X have been loaded, the trace stack can be initialized upon each new trace command to contain addresses from which instructions will never be fetched and executed, such as the addresses of control registers. Alternatively, the trace load bits in the trace stack can be cleared.

In FIG. 7, an interrupt occurs during clock cycle No. 3 while the instruction at B is being fetched. Interrupt control portion 59 of program flow control 17 (see FIG. 4) commences during clock cycle No. 4 to load pseudo-instructions PS1–PS5 sequentially into IRA 23. As discussed in more detail below, the program counter 21 is allowed to increment normally during clock cycles 4 and 5. Fetches from the addresses indicated by the program counter are not actually performed during clock cycles 4 and 5, but the instructions at A and B are executed and the program counter history is recorded by advancing the address pipeline during clock cycles 4 and 5. Because pseudo-instruction PS1 is jammed during clock cycle 4 directly into IRA 23 rather than the instruction fetched from address C, the instruction at B will be the last instruction executed before the interrupt is serviced. Therefore, when pseudo-instruction PS1 is loaded into IRA during clock cycle 4, TL__IPE is set, indicating that B represents a program counter discontinuity. SE__IPE is left cleared indicating that B is an end of block. Interrupt control 59 can load the trace load flip flops 45, 49 and 53 via control line 81. Although B is not strictly the last sequential address to pass through the PC 21, B is nevertheless traced as an end of block because it is the address of the last instruction executed before the interrupt routine.

During clock cycle No. 5, the instruction at B is executed and B is pushed onto trace stack 55 as an end of block address. Also during clock cycle No. 5, pseudo-instruction PS2 is jammed into IRA, the program counter is incremented from D to E, and addresses C and D are advanced into IPE and IPA respectively. After pseudo-instruction PS2 has been loaded in IRA, the interrupt control portion 59 freezes IPA 39 and IPE 41 via control lines 61 and 63 thereby halting the advancement of addresses toward the trace stack 55. At this time also, interrupt control portion 59 freezes PC 21 via control line 60.

Pseudo-instruction PS3 is executed during clock cycle No. 8, causing the program counter 21, which becomes unfrozen at this time, to be loaded with the start address I of the interrupt routine. Because the program counter is loaded rather than incremented as normal, SE__PC and TL__PC are set as discussed above to indicate that address I represents a program counter address discontinuity and a start of block. During execution of pseudo-instruction PS4 in clock cycle No. 9, IPA becomes unfrozen to permit address I to advance into IPA along with its corresponding start/end and trace load bits, while the corresponding instruction at I is fetched and loaded into IRA. During execution of pseudo-instruction PS5 during clock cycle No. 10, IPE also becomes unfrozen permitting address I to advance into IPE along with its corresponding start/end and trace load bits while the corresponding instruction advances into IRE. Once the instruction at I is executed during clock cycle No. 11, address I is pushed onto the trace stack along with its corresponding start/end bit (SE__IPE=1) to indicate that address I is a start of block. Reviewing the contents of trace stack 55 at the end of clock cycle No. 11, B is identified as an end of block and I is identified as a start of block, B being the address of the last instruction executed before the interrupt routine, and I being the start address of the interrupt routine.

Figure 8:
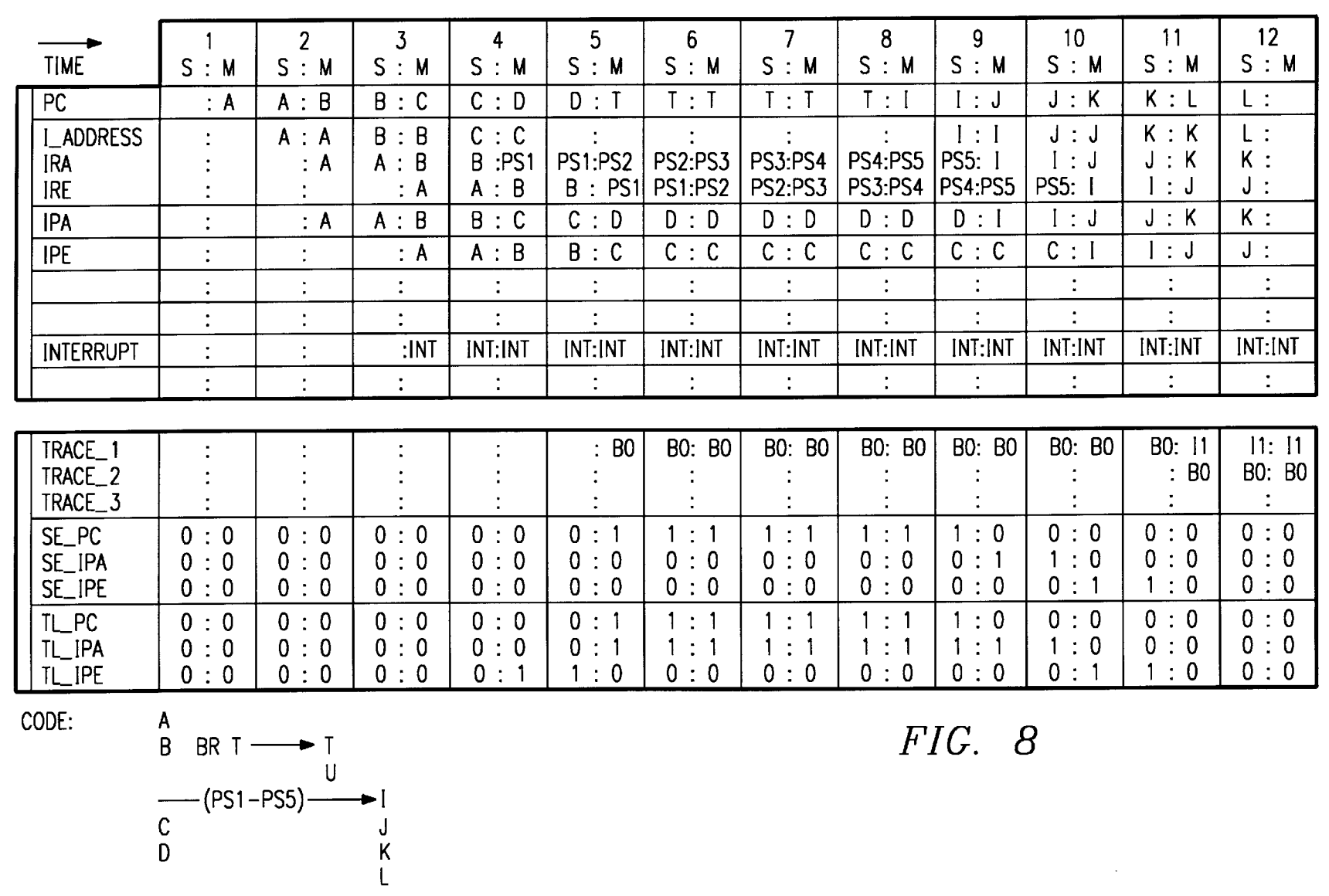

FIG. 8 illustrates a situation in which an interrupt occurs during a delay slot of a branch instruction at B. During clock cycle No. 4, pseudo-instruction PS1 is jammed into IRA 23 prior to execution of the branch instruction at B. As in FIG. 7 above, TL__IPE is set during clock cycle 4 so that the address B in the IPE will be pushed onto the trace stack as an end of block address. Because the program counter, IPA and IPE are not frozen until after pseudo-instruction PS2 is jammed into IRA, the branch instruction at B can still be executed during clock cycle No. 5, loading the program counter with T. Because the program counter is loaded in clock cycle 5, SE__PC and TL__PC are set to indicate that address T is a start of block. Address B is pushed onto the trace stack (after its execution in clock cycle No. 5) along with its corresponding start/end bit (SE__IPE=0) indicating that B is an end of block.

The program counter, IPA and IPE are frozen after pseudo-instruction PS2 has been jammed into IRA in clock cycle No. 5, and pseudo-instruction PS3 is executed during clock cycle No. 8 to load the program counter, which becomes unfrozen at this time, with the start address I of the interrupt routine. Because the program counter has been loaded, SE__PC and TL__PC must also be set, but this results in no change in SE__PC and TL__PC during clock cycle No. 8 because these bits were previously set in clock cycle No. 5 and are still frozen in the pipeline. During execution of pseudo-instruction PS4 in clock cycle No. 9, IPA becomes unfrozen, permitting I to advance into IPA while its corresponding start/end and trace load bits advance into SE__IPA and TL__IPA. Note that IPE is still frozen during clock cycle No. 9 so that the contents of IPA, SE__IPA and TL__IPA have nowhere to go and are simply overwritten as address I and its corresponding trace bits advance into this stage of the pipeline during clock cycle No. 9. The instruction at I is fetched and loaded into IRA during clock cycle No. 9, and the program counter is incremented to J. Both the instruction pipeline and the address pipeline advance normally during clock cycle No. 10, IPE having become unfrozen during execution of pseudo-instruction PS5 during clock cycle No. 10. The instruction at address I is executed during clock cycle No. 11 and address I is pushed onto the trace stack along with its corresponding start/end bit (SE__IPE=1) indicating that I is a start of block.

Reviewing the status of the trace stack after clock cycle 11, B is traced as an end of block address and I is traced as a start of block address.

Figure 12:
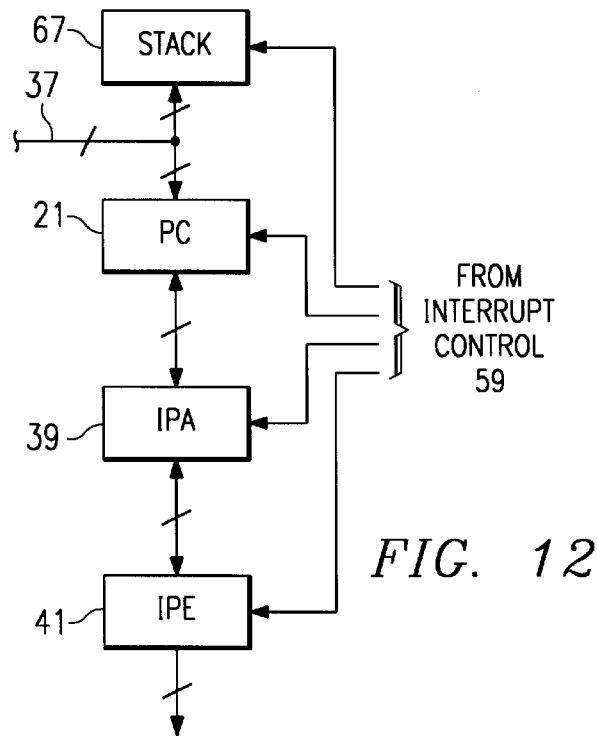
FIG. 12 is a block diagram which illustrates a modification of a portion of FIG. 4 to enable the data processing device of the present invention to recover successfully from interrupt s which occur during a branch delay slot.

FIG. 12 illustrates another use of the IPA and IPE history registers 39 and 41 from FIG. 4 in conjunction with the occurrence of an interrupt. The arrangement illustrated in FIG. 12 is capable of successfully handling interrupts that occur during delay slots of branch instructions in pipelined architectures. Referring again to FIG. 3, if an interrupt occurs during, for example, delay slot T3, and if the program counter is simply pushed onto a stack before the interrupt is serviced and popped from the stack after the interrupt is serviced, then the delay slot instructions 2 and 3 will not be executed after return from interrupt because only the address of instruction 4 will have been preserved on the stack. Therefore, in order to ensure that interrupts occurring during delay slots of branch instructions are successfully handled, the program counter 21, IPA 39 and IPE 41 are connected in FIG. 12 to form a bi-directional FIFO.

Referring also to FIG. 8, an interrupt occurs during clock cycle No. 3 with address A in IPE and its corresponding instruction in IRE, with address B in IPA and its corresponding instruction in IRA, and with address C in the program counter. In clock cycle 4, the interrupt control portion 59 of program flow control 17 begins jamming a sequence of pseudo-instructions PS1–PS5 into the instruction pipeline. The instruction pipeline registers IRA and IRE, a nd the address pipeline registers PC, IPA, and IPE are permitted to sequence as normal until after pseudo-instruction Ps2 has been loaded into the IRA in clock cycle 5. Therefore, in clock cycle 4 the instruction at A is executed and the program counter is auto-incremented to address D. Also in clock cycle 4 the first pseudo-instruction PS1 is jammed into IRA instead of the instruction at address C, the instruction at address B is moved into IRE while address B is moved into IPE and address C advances into IPA. During clock cycle 5, the branch instruction at B is executed, thereby loading T into the program counter. Also during clock cycle 5, pseudo-instruction PS1 advances into IRE, pseudo-instruction PS2 is jammed into IRA, address C advances into IPE and address D advances into IPA.

Relating FIGS. 8 and 12, after the branch instruction at B is executed in clock cycle 5, the program counter 21 contains T, IPA 39 contains D, and IPE 41 contains C. At this time, interrupt control 59 can cause the addresses T, D and C to be pushed consecutively onto a stack 67 so that, when returning from the interrupt, interrupt control 59 can simply pop addresses C, D, and T in that order into program counter 21. Thus, the branch delay slot instructions at C and D are processed sequentially before the instruction at T. Even though the interrupt in FIG. 8 occurs in a delay slot of the branch instruction at B, upon returning from the interrupt, the desired sequenced of instructions beginning at T will in fact be executed, after processing the intervening instructions at C and D. During trace operation, the start/end (SE) and trace load (TL) bits associated in the address pipeline with addresses T, D and C need not be pushed onto stack 67 with these addresses, because the addresses will be traced as new start addresses as they are popped from the stack 67 and loaded into PC 21.

As shown in FIGS. 8 and 12, the branch information of a branch instruction can be preserved upon interrupt by advancing both the instruction pipeline and the address pipeline through a number of stages equal to the number of delay slots in the pipeline (2 in a 3-stage pipeline), while allowing the instructions in the instruction pipeline to execute. If this is done, then the contents of the address pipeline can be pushed before executing the interrupt and popped after executing the interrupt as discussed above to successfully handle the interrupt without losing branch delay slot information.

FIG. 9 illustrates another example of the manner in which the present invention traces interrupts. The branch instruction at X is executed during clock cycle 2, loading the program counter with B. SE_PC and TL_PC are set during clock cycle 2 to indicate that address B is a start of block and TL_IPA is set during clock cycle 2 to indicate that address Z is an end of block. During clock cycle 4 the instruction at Z is executed and address Z is pushed onto the trace stack along with its start/end bit (SE_IPE=0) to indicate end of block. Also during clock cycle 4, the first pseudo-instruction PS1 is loaded into IRA. Ordinarily, the bit TP_IPE would also be set at the time that PS1 is loaded into IRA. However, the start/end bit and the trace load bit of instruction B were previously set when instruction B was loaded into the program counter. Thus, during clock cycle 4, when B advances into IPE, its start/end bit and its trace load bit also advance with it so that SE_IPE=TL_IPE=1 at the end of clock cycle 4. Although the loading of pseudo-instruction PS1 into IRA would normally cause TL_IPE to be set, that bit is set anyway due to the advancement through the pipeline of the trace load bit associated with B. Moreover, the loading of pseudo-instruction PS1 into IRA has no effect on SE_IPE which becomes a logic 1 as the pipeline advances during clock cycle 4.

The instruction at B is executed during clock cycle 5, and B is pushed onto the trace stack along with its start/end bit (SE_IPE=1) indicating a start of block. Thus, although the loading of PS1 into the IRA would normally cause the instruction at B to be designated as an end of block, address B is traced as a start of block instead because it was previously designated as such during clock cycle 2 and this previous designation as a start of block is not overridden by the loading of pseudo-instruction PS1 into IRA.

During clock cycle 8, pseudo-instruction PS3 is executed, loading the program counter with the starting address I of the interrupt routine. Due to the program counter load, SE_PC and TL_PC are set indicating that address I is a start of block. The instruction at I is executed during clock cycle 11, and I is pushed onto the trace stack along with its corresponding start/end bit (SE_IPE=1) indicating a start of block. Reviewing the contents of the trace stack, address Z is traced as an end of block, address B is traced as a start of block, and address I is traced as a start of block.

FIGS. 10–11 illustrate trace operations of the present invention while loop logic 69 in program flow control block 17 is controlling program flow. Loop logic 69 is utilized to streamline program flow when repeatedly looping back to execute a given sequence of instructions. This is conventionally accomplished by, for example, placing a conditional branch at the end of the instruction sequence, which conditional branch determines whether the sequence has been executed a predetermined number of times and, if not, directs program flow back to the beginning of the sequence.

The loop logic 69 is provided to eliminate the need for such a conditional branch instruction. Prior to executing the desired sequence of instructions, the starting and ending addresses of the sequence are provided to the loop logic 69 along with a loop count value which represents the number of times the sequence of instructions is to be executed. During the fetch stage of the pipeline, the loop logic compares the address of the instruction being fetched with the end address of the sequence. If the addresses match and if the loop count value is not zero, then the start address of the sequence is jammed into the program counter 21 at the end of the fetch stage, and the loop count value is decremented. By jamming the start address directly into the program counter, the delay associated with the use of branch instructions in pipelined architectures can be reduced.

FIG. 10 illustrates trace operations during execution of a sequence of instructions including a one instruction loop which starts and ends at address C. In FIG. 10, instructions at A and B are executed sequentially, followed by a one instruction loop at C, wherein C is both the start and end address. In this example, the loop count value is set to 3, so that the instruction at C will be executed in normal sequence after the instruction at B, after which the instruction at C will be repeated 3 times for a total of 4 executions. Thereafter, instructions at D and E are executed sequentially.

In clock cycle 4, a load instruction at address LD is executed to load the loop count value of 3 and provide the loop logic 69 with the start and end addresses of the loop sequence (both are C in this case). During clock cycle 5 the instruction at A is executed and the instruction at C is fetched. During the fetch operation, the loop logic 69 determines that the fetched address C matches the loop end address C, so start address C is jammed into the program counter using control line 81 and bus 37, and the loop count value is decremented from 3 to 2. Because the program counter was loaded, SE_PC and TL_PC are set along with TL_IPA using control lines 80–81. Also at the end of clock cycle 5, address C has advanced into IPA while its corresponding instruction, which was fetched during clock cycle 5, now resides in IRA, and address B has advanced into IPE while its corresponding instruction is in IRE.

During clock cycle 6 the instruction at B is executed and the instruction at C is fetched. Again, the loop logic 69 determines that the fetch address matches the end address and therefore loads the start address C into the program counter and decrements the loop count value from 2 to 1. The previously set start/end and trace load bits advance one stage in the pipeline and SE_PC, TL_PC and TL_IPA are s et because the program counter was loaded.

During clock cycle 7, the instruction at C is executed and the instruction at C is fetched. Because the fetch address matches the loop end address, the loop logic 69 loads the program counter with start address C and decrements the loop count value from 1 to 0. Because the instruction at C was executed during clock cycle 7, C is pushed onto the trace stack along with its start/end bit (SE_IPE=0) indicating that address C is an end of block, which is correct because this particular instance of address C was not loaded into the program counter but rather resulted from an increment in the program counter during clock cycle 4. Also during clock cycle 7, the previously set start/end and trace load bits advance one stage in the pipeline and SE_PC and TL PC and TL_IPA are set because the program counter was loaded.

During clock cycle 8, the instruction at C is executed and a fetch is performed at C. Because the loop count value is zero, the loop logic 69 is disabled and the program counter is auto-incremented to address D. Because the instruction at C was executed during clock cycle 8, C is pushed onto the trace stack along with its start/end bit (SE_IPE=1) indicating start of block. Start of block is the correct indication here because this instance of address C was loaded into the program counter. Thereafter during clock cycle 9, the instruction at C is executed, so that address C is pushed onto the trace stack along with its corresponding start/end bit (SE-IPE=1) indicating start of block. During clock cycle 10 the instruction at C is executed once again and address C is pushed onto the trace stack along with its corresponding start/end bit (SE_IPE=1). The instruction at D is executed during clock cycle 11 and the instruction at E is executed during clock cycle 12.

Reviewing the instruction execution in FIG. 10, the instructions at A and B were executed in sequence, the instruction at C was executed 4 times in sequence, followed by the instructions at D and E executed in sequence. Reviewing the contents of the trace stack in FIG. 10, address C was the start of block 3 times, one for each time that the execution of the instruction at C was repeated. The first execution of the instruction at C was recorded in the trace stack during clock cycle 7 as an end of block address, but this entry was eventually overwritten during clock cycle 10. Of course, this entry would be preserved by simply using a deeper stack.

FIG. 11 illustrates trace operations for a code sequence generally similar to that of FIG. 10 except that the instruction loop to be repeated contains two instructions. During clock cycle 2, a load instruction is executed to provide the loop logic 69 with the start (C) and end (D) addresses of the loop sequence, and a loop count value of 3 so that the two-instruction sequence at addresses C and D will be repeated 3 times for a total of 4 executions thereof. During clock cycle 4, the instruction at D is fetched and the loop logic recognizes that D is the loop end address and therefore loads start address C into the program counter and decrements the loop count value from 3 to 2. Because the program counter is loaded, SE_PC, TL_PC and TL_IPA are set, indicating that address D is an end of block and address C is a start of block. During clock cycle 5, the instruction at C is executed and the instruction pipeline and address pipeline experience normal advancement.

During clock cycle 6, the instruction at D is both executed and fetched. Because the instruction at D is executed, D is pushed onto the trace stack along with its corresponding start/end bit (SE_IPE=0) indicating end of block. While the instruction at D is being fetched, the loop logic 69 recognizes that D is the end of loop address and thus loads the program counter with C and decrements the loop count from 2 to 1. Because the program counter was loaded, SE_PC, TL_PC and TL_IPA are set to indicate that D is an end of block and C is a start of block.

During clock cycle 7, the instruction at C is executed and C is pushed onto the trace stack along with its corresponding start/end bit (SE_IPE=1) indicating start of block. During clock cycle 8, the instruction at D is executed and also fetched so that D is pushed onto the trace stack along with its corresponding start/end bit (SE_IPE=0) indicating end of block, the program counter is loaded with the start address C of the loop because the fetch address D matches the loop end address, and the loop count value is decremented from 1 to 0. Because the program counter is loaded, SE_PC, TL_PC and TL_IPA are set, designating C as a start of block and D as an end of block. During clock cycle 9, the instruction at C is executed so that address C is pushed onto the trace stack along with its corresponding start/end bit (SE_IPE=1) indicating start of block.

During clock cycle 10, the instruction at D is executed and also fetched. Because the instruction is executed, D is pushed onto the trace stack along with its corresponding start/end bit (SE_IPE=0) indicating end of block. The loop logic 69 does not respond to the fetch at D because the loop count value is 0, and therefore the program counter is permitted to auto-increment to the next successive address E.

During clock cycle 11, the instruction at C is executed and therefore C is pushed onto the trace stack along with its corresponding start/end bit (SE_IPE=1) indicating start of block. The instruction at D is executed during clock cycle 12, and the instruction at E will be executed in the following clock cycle.

Reviewing the instruction execution in FIG. 11, instructions at A and B were executed sequentially, followed by the sequence of instructions at C and D, which sequence was then repeated three times for a total of 4 executions of the sequence, followed by execution of the instruction at E. Examining the sequence of addresses which were pushed onto the top position TRACE_1 of the trace stack, address D as an end of block in clock cycle 6 is followed by address C as a start of block in clock cycle 7, and this sequence occurs again at clock cycles 8 and 9 and clock cycles 10 and 11. Thus, for each of the three repetitions of the two-instruction loop, address D is traced as and end of block and address C is traced as a start of block.

Figure 13:
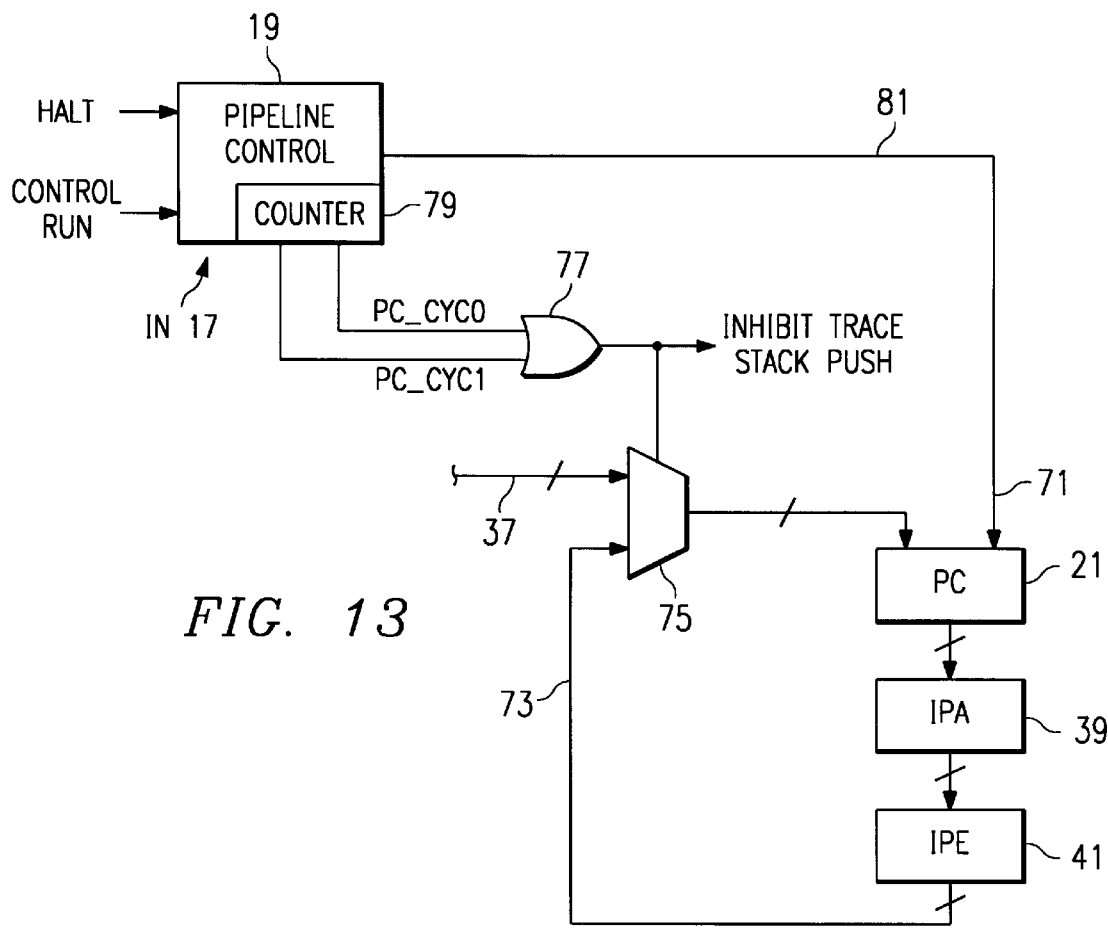
FIG. 13 is a modification of a portion of FIG. 4 to permit the data processing device of the present invention to resume an emulation run after an emulation halt has occurred during a branch delay slot.

FIG. 13 illustrates one example of how the address pipeline of FIG. 4 can be used to halt and restart the pipelined data processor 11 of FIG. 1 to permit accurate emulation of the data processor's operation. The history registers IPA 39 and IPE 41 are used to save the addresses of the instructions that would have been executed if the processor was not halted. Upon restart, this address history is used to restart execution at the proper point. In FIG. 13, the output of IPE 41 is connected via bus 73 to one input of a multiplexer 75. The other input of multiplexer 75 is connected to bus 37 of FIG. 4. The output of multiplexer 75 is connected to the program counter 21 so that the program counter 21 can be selectively loaded from either bus 73 or bus 37.

The select input of multiplexer 75 is connected to the output of an OR gate 77, which OR gate 77 has two inputs connected to the outputs of a counter 79 in the pipeline control portion 19 of program flow control 17 (FIG. 4). Pipeline control 19 receives a HALT input and a CONTROL RUN input. These inputs direct the halting, restarting and running of the data processor 11. The HALT and CONTROL RUN signals can be generated in any convenient manner, for example, by using an external emulation control unit to drive a state machine provided in a test port of the data processor 11.

In response to the HALT signal the data processor 11 is halted and t h e counter 79 is loaded so that its outputs PC_CYC0 and PC_CYC1 drive the output of OR gate 77 high, thereby connecting bus 73 to the load input of program counter 21 via multiplexer 75. When it is desired to restart the data processor 11, the CONTROL RUN signal is driven active. By virtue of the high output of OR gate 77, the program counter 21 is loaded from IPE 41 upon each master clock while CONTROL RUN is active, and the counter 79 is decremented during each clock cycle until bits PC_CYC0 and P_CYC1 are both 0. When PC_CYC0=PC_CYC1=0, the output of OR gate 77 is taken low, so that the input of program counter 21 is connected to bus 37 via multiplexer 75. Thus, when the CONTROL RUN signal is activated upon restart, the addresses within the address pipeline are recycled through the program counter via bus 73 and multiplexer 75 until counter 79 counts down to the point where PC_CYC0 and PC_CYCL are both 0.

FIG. 14 illustrates the operation of the FIG. 13 structure when the HALT signal is activated to halt the processor. During the first three clock cycles, the CONTROL RUN signal (represented by C in the bottom line) is active. On the slave edge of clock cycle No. 4, the HALT signal (represented by H) becomes active, with address A in IPE, address B in IPA and address C in the program counter. In response to the HALT signal, pipeline control 19 (FIG. 4), on the master clock edge of clock cycle No. 4, aborts the ongoing fetch of the instruction at C, jams a null instruction into IRA, permits the program counter to auto-increment to D, advances the instruction at B in the instruction pipeline to IRE, and advances addresses B and C into IPE and IPA respectively. The instruction at A is executed during clock cycle No. 4. The aforementioned instruction fetch abort is designated in FIG. 14 by ab, and the null instruction is designated in FIG. 14 by nu. As long as the HALT signal is active, all instruction fetches are aborted and null instructions are continuously jammed into IRA. The null instruction is similar to a no-operation (NOP) instruction, except when a null instruction reaches the execute stage of the instruction pipeline, it prevents the program counter 21, IPA 39 and IPE 41 from advancing. Alternatively, rather than jamming a null instruction, pipeline control 19 could instead respond to the HALT signal by directly nullifying the contents of the instruction pipeline and freezing the address pipeline.

During clock cycle No. 5, the instruction at B is executed, and both the address and instruction pipelines are advanced so that IPE, IPA and the program counter respectively contain addresses C, D, E. During clock cycle No. 5, the first null instruction reaches the execute stage at IRE, thereby freezing program counter 21, IPA 39 and IPE 41. Also as a result of the null instruction reaching the execute stage of the instruction pipeline, the counter bits PC_CYC1 and PC_CYC0 are each initialized to a logic 1. Thus, once the HALT signal becomes active in FIG. 14, both of the instructions in the instruction pipeline are executed and the address pipeline advances two stages, whereupon the first null instruction then reaches the execute stage of the instruction pipeline, freezes the address pipeline, and initializes counter bits PC_CYC1 and PC_CYC0 to logic 1.

FIG. 15 picks up essentially where FIG. 14 left off, that is with the processor HALTed, and illustrates operation of the present invention when a restart occurs after the processor has been HALTed. Continuing then from FIG. 14, in FIG. 15 the program counter, IPA and IPE respectively contain addresses E, D and C, PC_CYC and PC_CYC1 are both set to logic 1, and HALT (H) is active. CONTROL RUN (C) becomes active on the slave edge of the clock cycle No. 2, causing pipeline control 19 to unfreeze the address pipeline. Because PC_CYC0 and PC_CYC1 are both set, the output of OR gate 77 is high, thereby permitting the program counter 21 to be loaded from IPE via bus 73 and multiplexer 75 on the master edge of clock cycle No. 2. Thus, at the end of clock cycle No. 2, the program counter, IPA and IPE respectively contain addresses C, E and D. Address C having now been recycled into the program counter, counter 79 of FIG. 13 is decremented on the slave edge of clock cycle No. 3.

During clock cycle No. 3, the instruction at C is fetched and loaded into IRA. On the master edge of clock cycle No. 3, address D is recycled from IPE 41 into the program counter 21 via the bus 73 and multiplexer 75, address C advances into IPA, and address E advances into IPE. The counter 79 is decremented on the next slave edge (clock cycle No. 4).

During clock cycle No. 4, the instruction at D is fetched and loaded into IRA. On the master edge of clock cycle No. 4, address E is recycled from IPE into the program counter, address C and its corresponding instruction advance into the execute stage, and address D and its corresponding instruction advance into the address stage. The counter 79 is decremented on the next slave edge (clock cycle No. 5), leaving both PC_CYC0 and PC_CYC1 at logic 0, which drives the output of OR gate 77 low to connect bus 37 to the load input of the program counter 21.

The instructions at C and E are respectively executed and fetched during clock cycle No. 5, and the instructions at D and E are respectively executed during clock cycles 6 and 7. Recalling from FIG. 14 that the instruction at B was the last instruction executed before the processor was halted, it can be seen in FIG. 15 that the pipeline recycling arrangement of FIG. 13 permits the next instruction in sequence, namely the instruction at C, to be executed next upon restarting the processor. It is clear from FIG. 15 that, without the address pipeline recycling arrangement of FIG. 13, the instructions at C and D would never have entered the instruction pipeline (i.e. would never have been fetched and loaded into IRA) after restarting the processor.

During trace operation, trace stack pushes are inhibited while the output of OR gate 77 is high, and the recycled addresses are designated start of block discontinuities as they are loaded into PC 21. After the last address is recycled and the OR gate output goes low, the recycled addresses can then be pushed on the trace stack 55.

FIG. 16 illustrates processor halt and restart during execution of a three instruction loop. HALT occurs during clock cycle No. 4 while the instruction at A is being executed and the instruction at C is being fetched. Pipeline control 19 begins jamming a sequence of null instructions into the instruction pipeline and, although the fetch at C is aborted, loop logic 69 nevertheless recognizes C as the end of loop address and therefore jams start address A into the program counter and decrements the loop count value from 3 to 2. Also during clock cycle No. 4, addresses B and C advance into IPE and IPA, respectively, and the instruction at B advances into IRE.

During clock cycle No. 5, the instruction at B is executed, the program counter is auto-incremented to B, the first null instruction reaches the IRE, and A and C advance into IPA and IPE, respectively. Because the first null instruction has reached the execute stage, the address pipeline becomes frozen, and PC_CYC0 and PC_CYC1 are each initialized to logic 1 on the slave edge of clock cycle No. 6. In addition, the loop logic 69 is disabled when the first null instruction is advanced into IRE.

The address pipeline, frozen in response to advancement of the first null instruction into IRE, remains frozen until the CONTROL RUN signal becomes active during clock cycle No. 8. In response to the CONTROL RUN signal, pipeline controller 19 operates to unfreeze the address pipeline so that, on the master edge of clock cycle No. 8, C is recycled from IPE 41 into the program counter 21 while B and A are advanced respectively into IPA 39 and IPE 41. Counter 79 is decremented on the slave edge of clock cycle No. 9, so that PC_CYC0 changes from 1 to 0. Also during clock cycle No. 9, the instruction at C is fetched and loaded into IRA, C advances from the program counter 21 into IPA 39, B advances from IPA 39 into IPE 41, and A is recycled from IPE 41 into the program counter 21. On the slave edge of clock cycle No. 10, the counter 79 is decremented again leaving PC_CYC1 at 0 and PC_CYC0 at 1. Also during clock cycle No. 10, the instruction at A is fetched and loaded into IRA, the instruction at C advances into IRE, A advances into IPA, C advances into IPE and B is recycled into the program counter.

Counter 79 is decremented on the slave edge of clock cycle No. 11, leaving both PC_CYC0 and PC_CYC1 at logic 0. Also during clock cycle No. 11, execution of the instruction at C is completed, the instruction at B is fetched and loaded into IRA, the instruction at A advances into IRE, the address B advances from the program counter into IPA, the address A advances from IPA into IPE, and the program counter 21 is auto-incremented from B to C. Note C is not recycled from IPE into the program counter during clock cycle No. 11 because counter 79 has been decremented to the point that both inputs (PC_CYC0 and PC_CYC1) to OR gate 77 are 0. Once the counter 79 has decremented this far, pipeline control 19 allows the PC 21 to increment as usual. The loop logic 69 is re-enabled when PC_CYC0 and PC_CYC1 become 0.

During clock cycle No. 12, the instruction at A is executed and the instruction at C is fetched. The loop logic recognizes during the instruction fetch that C is the loop end address, and therefore jams start address A into the program counter and decrements the loop count value from 2 to 1.

Reviewing the instruction execution in FIG. 16, the instruction at B was the last instruction executed (during clock cycle No. 5) before the null instructions filled the instruction pipeline. The address pipeline became frozen with B in the program counter, A in IPA and C in IPE. When CONTROL RUN became active, C, A and B were sequentially recycled through the program counter so that the corresponding instructions were fetched and executed in the proper sequence as though the HALT had never occurred. Note that the loop logic 69 did not respond to the fetch at C during clock cycle No. 9 because the loop logic was previously disabled and remained so until PC_CYC0 and PC_CYC1 were both cleared in clock cycle No. 11. The fetch at C during clock cycle No. 9 in effect takes the place of the aborted fetch at C during clock cycle No. 4. The loop logic 69 jammed the PC 21 with A and decremented the loop count value from 3 to 2 in response to the earlier, aborted fetch at C. Thus, no loop logic activity is needed in clock cycle 9.

FIG. 17 illustrates the operation of FIG. 13 when HALT becomes active during a processor interrupt. The interrupt occurs on the master edge of clock cycle No. 3, and pseudo-instruction PS1 advances into IRE on the master edge of clock cycle No. 5, freezing the address pipeline with the program counter, IPA and IPE respectively containing E, D and C. HALT occurs during clock cycle No. 6. However, the interrupt sequence of pseudo-instructions PS1–PS5 is treated as a single instruction, and the HALT process is therefore not started until after the start address I1 of the interrupt routine has been loaded into the program counter, in this case during clock cycle No. 8. After I1 enters the program counter, the HALT condition causes the fetch at I1 to be aborted, and causes a series of null instructions to be jammed into the instruction pipeline beginning on the master edge of clock cycle No. 9. The address pipeline advances normally during clock cycle No. 9 and clock cycle No. 10. After the first null instruction has advanced into the IRE on the master edge of clock cycle No. 10, the address pipeline is frozen. On the slave edge of clock cycle No. 11, the counter 79 is initialized with PC_CYC0 and PC_CYC1 being set to 1. At this point, the HALT process has been completed, and restarting from this condition is accomplished as described above with respect to FIG. 15.

FIG. 18 illustrates how data processor 11 is restarted from a halted condition if an interrupt has occurred while the processor was halted. Beginning with clock cycle No. 1, HALT has been completely executed by the time the slave edge of clock cycle No. 1 occurs, with both bits PC_CYC0 and PC_CYC1 of counter 79 initialized to 1, and with the address pipeline frozen with address C in the program counter 21, address B in IPA 39 and address A in IPE 41, and with null instructions in IRA and IRE. The interrupt occurs on the master edge of clock cycle No. 1, but cannot be serviced until the processor is restarted from the HALT condition. CONTROL RUN becomes active on the slave edge of clock cycle No. 3, and address A is recycled from IPE 41 into program counter 21 on the master edge of clock cycle No. 3 while C and B advance respectively into IPA 39 and IPE 41.

During clock cycle No. 4, counter 79 is decremented and the address pipeline is recycled by one stage again, leaving B, A and C respectively in the program counter 21, IPA 39 and IPE 41. Also during clock cycle No. 4, interrupt control 59 overrides the fetch at A and jams the first pseudo-instruction PS1 into IRA. During clock cycle No. 5, the address pipeline is recycled again by one stage, the counter 79 is decremented again, pseudo-instruction PS1 advances into IRE, and pseudo-instruction PS2 is jammed into IRA. Upon the jam of pseudo-instruction PS2 into IRA, the address pipeline is frozen with C in the program counter 21, B in IPA 39 and A in IPE 41. Due to the occurrence of the interrupt, the fetch at A and subsequent fetches were aborted. However, by the end of clock cycle No. 5, the contents of the address pipeline are the same as during clock cycle No. 1 when the interrupt actually occurred. Addresses C, B and A can simply be pushed onto stack 67 of FIG. 13 before execution of the interrupt routine, and then popped sequentially back into the program counter after the interrupt so that the instruction pipeline can be properly refilled as discussed above with respect to FIG. 13.

FIG. 19 illustrates the manner in which the arrangement of FIG. 13 is used to single step the data processor 11. Single stepping is achieved by first halting the processor, then making CONTROL RUN active for one clock cycle, and then halting the processor. In FIG. 19, HALT goes active during clock cycle No. 4, and the first null instruction advances into IRE during clock cycle No. 5. Thus, the instruction at B is the last instruction executed, and the address pipeline is frozen with program counter 21, IPA 39 and IPE 41 respectively containing address E, D and C. PC_CYC0 and PC_CYC1 of counter 79 are initialized during clock cycle No. 6. When CONTROL RUN becomes active during clock cycle No. 7, address C is recycled from IPE 41 into program counter 21, with addresses E and D advancing into IPA 39 and IPE 41 respectively.

During clock cycle No. 8, counter 79 is decremented, the instruction at C is fetched, D is recycled into program counter 21, and HALT becomes active. Pipeline control 19 does not abort the fetch at C, but rather allows the pipeline to advance in this instance because the outputs PC_CYC0 and PC_CYC1 of counter 79 (PC_CYC0=0 and PC_CYC1=1) indicate that the fetch at C is under way, starting the single stepping operation. During clock cycle No. 9, the counter 79 is decremented, address E is recycled into the program counter 21, the instruction at C advances into IRE, the fetch at D is aborted, and a null instruction is jammed into IRA.

During clock cycle No. 10, counter 79 is decremented, the instruction at C is executed, the program counter 21 is auto-incremented to F, and the first null instruction advances into IRE and freezes the address pipeline with program counter 21, IPA 39 and IPE 41 respectively containing F, E and D. During clock cycle No. 11, the counter bits PC_CYC0 and PC_CYC1 are re-initialized to logic 1.

Reviewing the execution sequence in FIG. 19, the instruction at B was the last instruction executed after HALT became active during clock cycle No. 4. As a result of CONTROL RUN becoming active during clock cycle No. 7, followed by HALT becoming active again during clock cycle No. 8, the instruction at C was ultimately executed, and the address pipeline was thereafter frozen with D, E and F located respectively in IPE 41, IPA 39 and the program counter 21. Thus, the next sequential instruction at C was executed as desired, and D will be recycled through the program counter when CONTROL RUN next becomes active, so that the instruction at D will be the next instruction executed when the processor is again restarted.

Figures 20, 21:
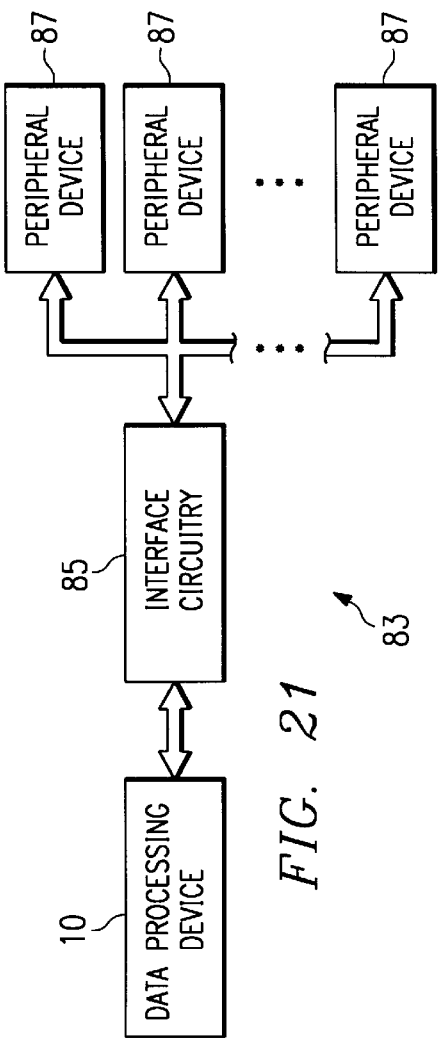
FIG. 20 is a timing diagram which illustrates the restart operation of the present operation after an emulation halt has occurred during a branch delay slot.
FIG. 21 is a block diagram which illustrates an electronic system according to the present invention.

FIG. 20 illustrates the operation of the data processor 11 when, during a delay slot of a branch instruction, the processor is halted and thereafter restarted. In FIG. 20, the branch instruction at B is in IRA 23 when HALT becomes active during clock cycle No. 4, and is executed during clock cycle No. 5 before the first null instruction advances into IRE 25. Execution of the branch instruction at B during clock cycle No. 5 loads T into the program counter. Thus, when the first null instruction reaches IRE 25, the address pipeline is frozen with C, D and T respectively contained in IPE 41, IPA 39 and the program counter 21. The counter 79 is initialized on the slave edge of clock cycle No. 6, setting both PC_CYC0 and PC_CYC1 to logic 1.

CONTROL RUN becomes active during clock cycle No. 8, and address C is recycled into program counter 21 while addresses T and D respectively advance into IPA 39 and IPE 41. During clock cycle No. 9, the counter 79 is decremented, address D is recycled into program counter 21, and the instruction at C is fetched. In clock cycle No. 10, the counter 79 is decremented, the instruction at D is fetched, address T is recycled into program counter 21, and the instruction at C advances into IRE 25. During clock cycle No. 11, counter 79 is decremented to PC_CYC0=PC_CYC1=0, the instruction at T is fetched, the program counter 21 is auto-incremented to U, and execution of the instruction at C is completed. As CONTROL RUN remains active, execution of the instruction at D will be completed during clock cycle No. 12, followed by execution of the instruction at T during clock cycle No. 13 (not shown).

Reviewing the execution sequence in FIG. 20, branch instruction B is executed after HALT occurs but before the address pipeline is frozen, so that address T is loaded into the program counter 21 before the address pipeline is frozen. Recycling of the address pipeline upon restarting the processor permits the instructions at C, D and T to be executed in sequence upon restart in the same manner that they would have been executed had the processor not been halted.

As shown in FIG. 21, and as will be evident to those of ordinary skill in the art, the pipelined data processing device 10 disclosed herein can be utilized in a wide variety of electronic systems, a block diagram of one such system being shown at 83 in FIG. 21. In the electronic system 83, the pipelined data processing device 10 is connected to a plurality of peripheral devices 87 by suitable interface circuitry 85. The electronic system 83 could be, as one example, an image processing system wherein the set of peripheral devices 87 includes an image sensor, a video display unit, and an image printer. As another example, the electronic system 83 could be a single chip ASIC device in which the pipelined data processing device 10 functions as a core processor and the set of peripheral devices 87 includes user definable circuitry such as RAM, ROM, a bus controller, an I/O driver, a programmable logic array (PLA), etc.

The invention described herein is applicable to pipelined architectures in general, and it is recognized that the invention can be used in any data processing device that employs a pipelined architecture, regardless of whether the data processing device is implemented as a single chip device, a multiple-chip device, a multiple-printed circuit board device, a multiple-computer device or any other configuration. The tracing and address recycling features described herein are particularly useful when provided as part of a single chip pipelined data processor, because these features enable the single chip processor to support emulation of its own operation.

Although the invention has been described with respect to certain exemplary embodiments thereof, the described embodiments do not limit the scope of the invention, which can be practiced in a variety of embodiments.

What is claimed is:

1. A data processor which performs operations specified by instructions fetched from a memory, comprising:

a program counter for holding an address of the next instruction to be fetched from memory;

an instruction pipeline which permits the data processor to perform operations specified by a first instruction, which has already been fetched from a first address in memory, while simultaneously fetching from memory a second instruction at a second address contained in said program counter;

an address pipeline coupled to said program counter for maintaining a record of said first address while said data processor performs the operations specified by said first instruction; and a recycling circuit connected between said program counter and said address pipeline for shifting said first address from said address pipeline into said program counter independently of said instruction pipeline.

2. The data processor of claim 1, wherein said recycling circuit operates in response to a stopping and subsequent restarting of said data processor.

3. The data processor of claim 2, wherein said recycling circuit includes a counter which begins counting upon restart of the data processor to control recycling of said first address into said program counter.

4. The data processor of claim 1, wherein said recycling circuit includes circuitry for selectively permitting said program counter to be loaded from said address pipeline.

5. The data processor of claim 1, including flow control circuitry coupled to said instruction pipeline and responsive to a HALT signal to enter into said instruction pipeline a null instruction which freezes the address pipeline.

6. The data processor of claim 1, wherein said instruction pipeline includes a first instruction register for holding therein said first instruction while said second instruction is being fetched, said address pipeline including a first history register for holding therein said first address while said first instruction is in said first instruction register.

7. The data processor of claim 6, wherein said instruction pipeline includes a second instruction register for holding therein a third instruction while said first instruction is in said first instruction register and said second instruction is being fetched, said third instruction having already been fetched from a third address in memory, and said address pipeline including a second history register for holding therein said third address while said third instruction is in said second instruction register.

8. The data processor of claim 7, wherein said second instruction register is provided within an address stage of said instruction pipeline, said address stage operable to generate any memory addresses required by said third instruction.

9. The data processor of claim 7, wherein said program counter and said history registers are interconnected, and wherein said third address immediately preceded said second address in said program counter, said first address immediately preceded said third address in said second history register, and said first address immediately preceded said third address in said program counter.

10. The data processor of claim 9, wherein said first, third and second addresses, in that order, constitute a continuous sequence of addresses.

11. The data processor of claim 9, wherein said third address and one of said first and second addresses define therebetween a discontinuity, and wherein said third address and the other of said first and second addresses constitute a continuous sequence of addresses.

12. The data processor of claim 9, wherein said first and third addresses define a discontinuity therebetween, and wherein said second and third addresses define a discontinuity therebetween.

13. The data processor of claim 6, wherein said program counter is interconnected with said first history register, and wherein said first address immediately preceded said second address in said program counter.

14. The data processor of claim 13, wherein said first and second addresses, in that order, constitute a continuous sequence of addresses.

15. The data processor of claim 13, wherein said first and second addresses define a discontinuity therebetween.

16. A data processing system, comprising:

a data processor which performs operations specified by instructions fetched from a memory;

a plurality of peripheral devices coupled to said data processor for providing information to said data processor and receiving information from said data processor;

said data processor including a program counter for holding an address of the next instruction to be fetched from memory, an instruction pipeline for permitting the data processor to perform operations specified by a first instruction which has already been fetched from a first address in memory while simultaneously fetching from memory a second instruction at a second address contained in said program counter, and an address pipeline coupled to said program counter for maintaining a record of said first address while said data processor performs the operations specified by said first instruction; and a recycling circuit connected between said program counter and said address pipeline for shifting said first address from said address pipeline into said program counter independently of said instruction pipeline.

17. The data processor of claim 16, wherein said recycling circuit operates in response to a stopping and subsequent restarting of said data processor.

18. The data processing system of claim 16, wherein said data processing system is provided on a single semiconductor chip.

19. A method of halting and thereafter restarting a pipelined data processor having an instruction pipeline and a program counter which successively holds therein each one of a succession of addresses at which are located instructions to be fetched from a memory into said instruction pipeline, comprising the steps of:

maintaining during data processor operation an address pipeline which keeps a running record of a preceding program counter address which immediately preceded in the program counter a current address currently in the program counter;

halting operation of the data processor with the current address in the program counter; and restarting operation of the data processor, including shifting said preceding program counter address from the address pipeline into the program counter independently of the instruction pipeline and initiating an instruction fetch at said preceding program counter address, and thereafter loading the program counter with said current program counter address and initiating an instruction fetch at said current program counter address.

20. The method of claim 19, including moving said preceding program counter address through a recycling path that includes the address pipeline and begins and ends at the program counter.

* * * * *